(12) United States Patent
Fujita et al.

(10) Patent No.: US 11,926,074 B2
(45) Date of Patent: Mar. 12, 2024

(54) INCISED PREPREG, CROSS-PLY LAMINATE, AND PRODUCTION METHOD FOR INCISED PREPREG

(71) Applicant: Toray Industries, Inc., Tokyo (JP)

(72) Inventors: Yuzo Fujita, Ehime (JP); Yuta Naito, Ehime (JP); Ichiro Taketa, Ehime (JP); Shiori Kawamoto, Ehime (JP); Yoshitaka Koyama, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 608 days.

(21) Appl. No.: 17/137,635

(22) Filed: Dec. 30, 2020

(65) Prior Publication Data
US 2021/0114342 A1    Apr. 22, 2021

Related U.S. Application Data

(62) Division of application No. 15/767,889, filed as application No. PCT/JP2016/081170 on Oct. 20, 2016, now Pat. No. 10,913,236.

(30) Foreign Application Priority Data

Oct. 27, 2015 (JP) ................................ 2015-210445
Dec. 25, 2015 (JP) ................................ 2015-253487
Mar. 16, 2016 (JP) ................................ 2016-051891

(51) Int. Cl.
*B29B 15/08* (2006.01)
*B29C 70/10* (2006.01)
(Continued)

(52) U.S. Cl.
CPC .............. *B29B 15/08* (2013.01); *B29C 70/10* (2013.01); *B29C 70/545* (2013.01); *B32B 5/12* (2013.01);
(Continued)

(58) Field of Classification Search
CPC ....... B29B 15/08; B29C 70/46; B29C 70/081; B29C 70/10; B29C 70/14; B29C 70/205;
(Continued)

(56) References Cited

U.S. PATENT DOCUMENTS 6,454,893 B1   9/2002 McKague
8,758,874 B2   6/2014 Taketa et al.
(Continued)

FOREIGN PATENT DOCUMENTS

JP    63247012 A   10/1988
JP    0825491 A    1/1996
(Continued)

OTHER PUBLICATIONS

International Search Report and Written Opinion for International Application No. PCT/JP2016/081170, dated Nov. 29, 2016, 9 pages.
(Continued)

*Primary Examiner* — Camie S Thompson
(74) *Attorney, Agent, or Firm* — Buchanan Ingersoll & Rooney P.C.

(57) ABSTRACT

An intermediate base material is provided that is excellent in the conformity to three-dimensional shapes and that, when formed into a fiber reinforced plastic, develops good surface quality and high mechanical properties.
According to one aspect, an incised prepreg is provided that has, in at least a partial region in a prepreg that contains unidirectionally oriented reinforcing fibers and a resin, a plurality of incisions that divide reinforcing fibers, wherein, in the case where a population is made up of the numbers of incisions contained in ten small circular regions of 10 mm in diameter randomly selected in the aforementioned region, a mean value for the population is 10 or greater and a coefficient of variation therefor is within 20%.

12 Claims, 10 Drawing Sheets

(51) Int. Cl.
*B29C 70/54* (2006.01)
*B32B 5/12* (2006.01)
*B32B 5/28* (2006.01)
*B32B 27/12* (2006.01)
*B32B 27/30* (2006.01)
*C08J 5/24* (2006.01)
*C08L 23/06* (2006.01)

(52) U.S. Cl.
CPC .............. *B32B 5/28* (2013.01); *B32B 27/12* (2013.01); *C08J 5/243* (2021.05); *B32B 27/30* (2013.01); *C08J 2300/22* (2013.01); *C08J 2300/24* (2013.01); *C08L 23/06* (2013.01); *C08L 2203/16* (2013.01)

(58) Field of Classification Search
CPC .............. B29C 70/50; B29C 70/545; B29C 2793/0081; B29C 2793/0036; C08J 5/24; C08J 5/243; C08J 5/04; C08J 2300/22; C08J 2300/24; B32B 5/12; B32B 5/26; B32B 5/28; B32B 27/13; B32B 27/30; B32B 2306/076; C08L 23/06; C08L 2203/16
See application file for complete search history.

(56) References Cited

U.S. PATENT DOCUMENTS

2016/0194468 A1  7/2016  Ogasawara et al.
2017/0283571 A1  10/2017  Taketa et al.

FOREIGN PATENT DOCUMENTS

| | | |
|---|---|---|
| JP | 2008279753 A | 11/2008 |
| JP | 2009220480 A | 10/2009 |
| JP | 2010023449 A | 2/2010 |
| JP | 5223354 B2 | 6/2013 |
| JP | 2014189722 A | 10/2014 |
| WO | 2008099670 A1 | 8/2008 |
| WO | 2015037570 A1 | 3/2015 |
| WO | 2016043156 A1 | 3/2016 |

OTHER PUBLICATIONS

Entire patent prosecution history of U.S. Appl. No. 15/767,889, filed Apr. 12, 2018, entitled. "Incised Prepreg, Cross-Ply Laminate, and Production Method for Incised Prepreg."

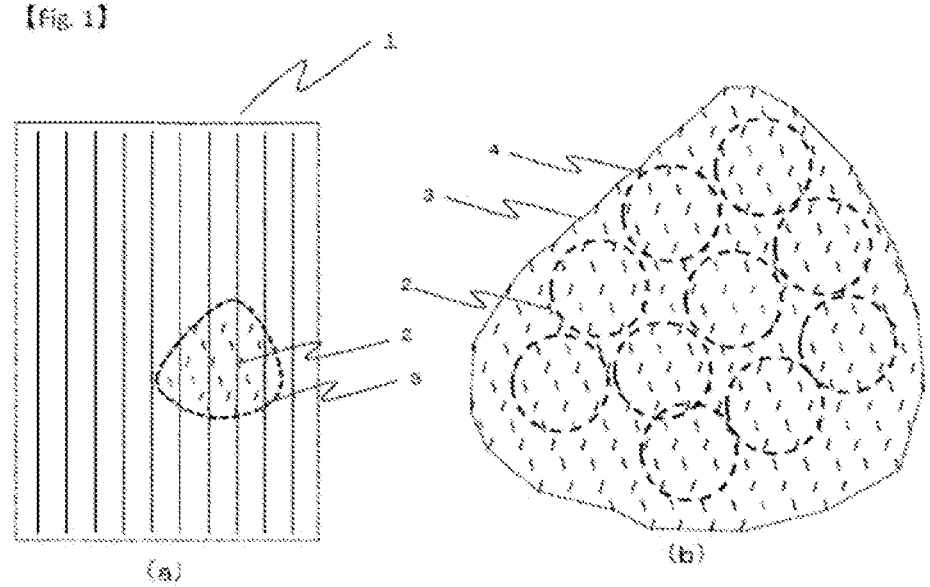
[Fig. 1]
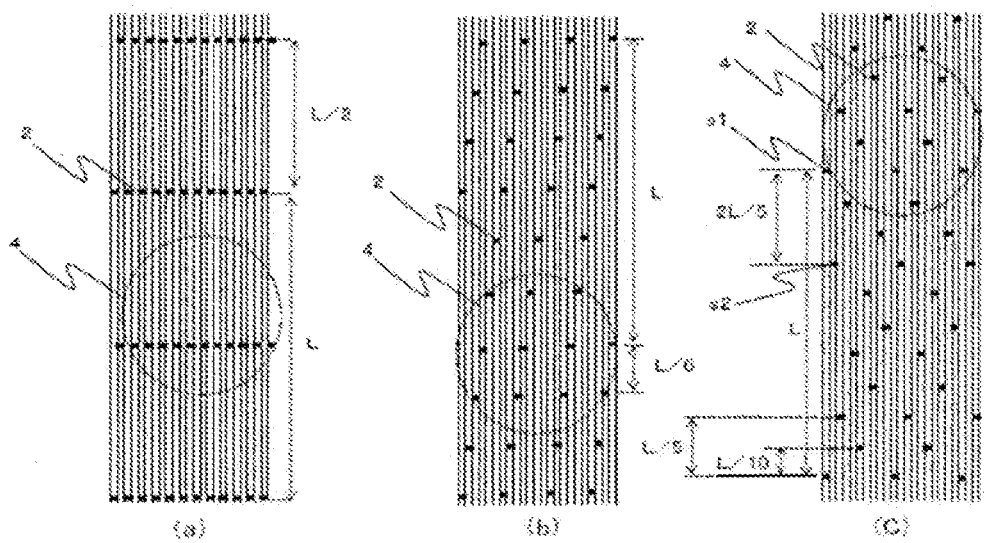
[Fig. 2]

[Fig. 3]
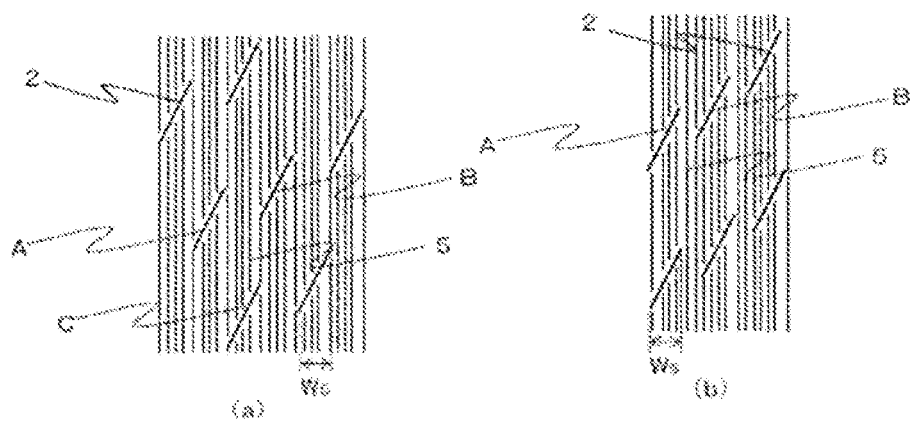
[Fig. 4]
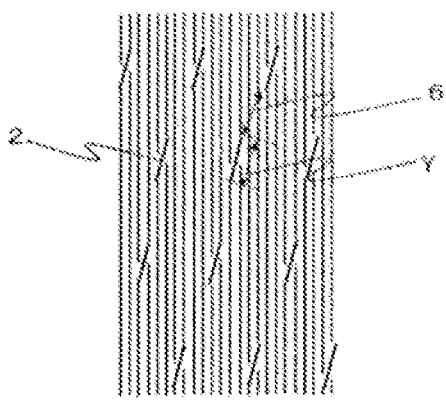

[Fig. 5]
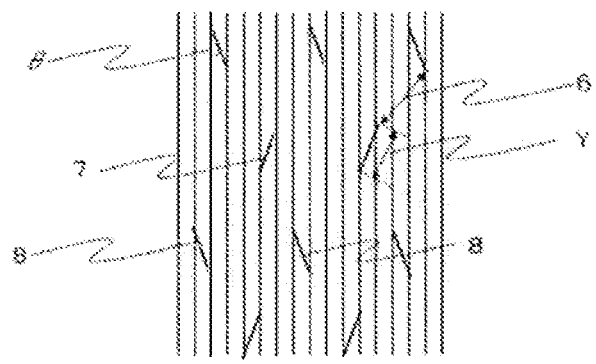
[Fig. 6]
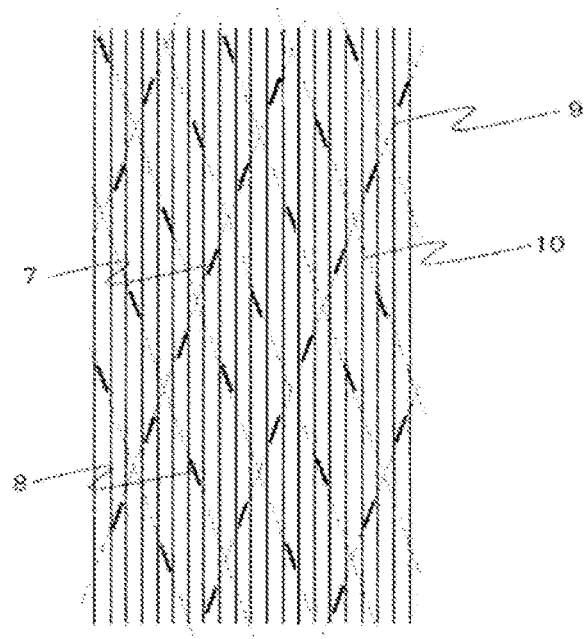

[Fig. 7]
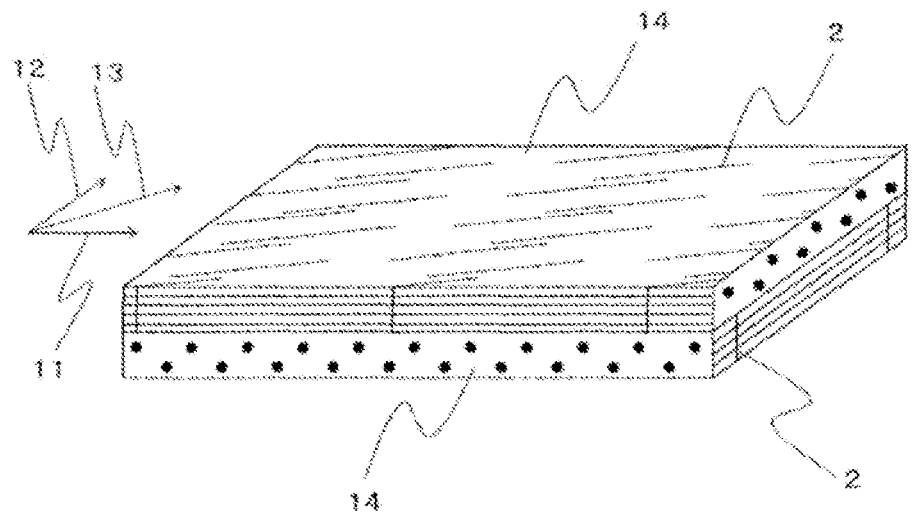
[Fig. 8]
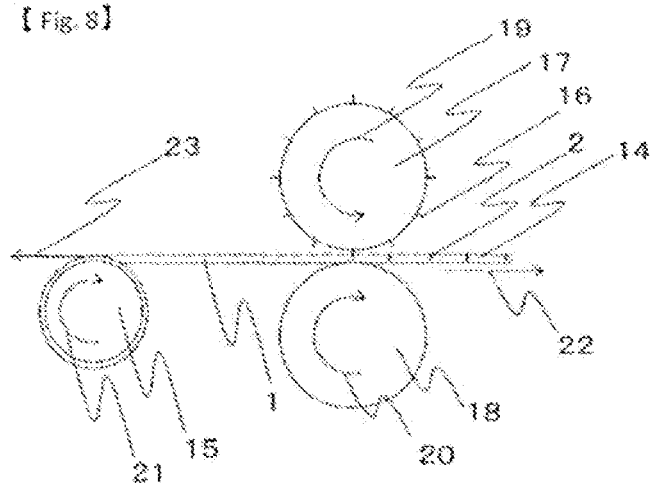

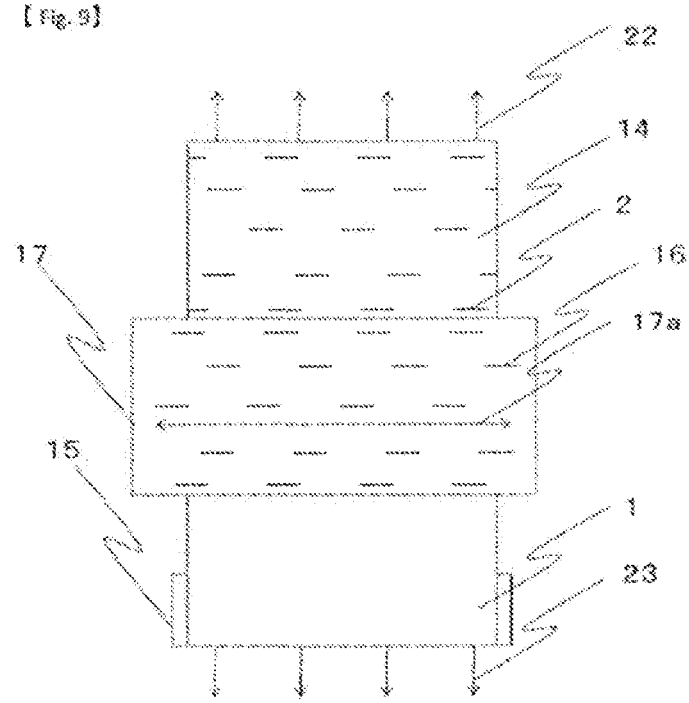
[Fig. 9]
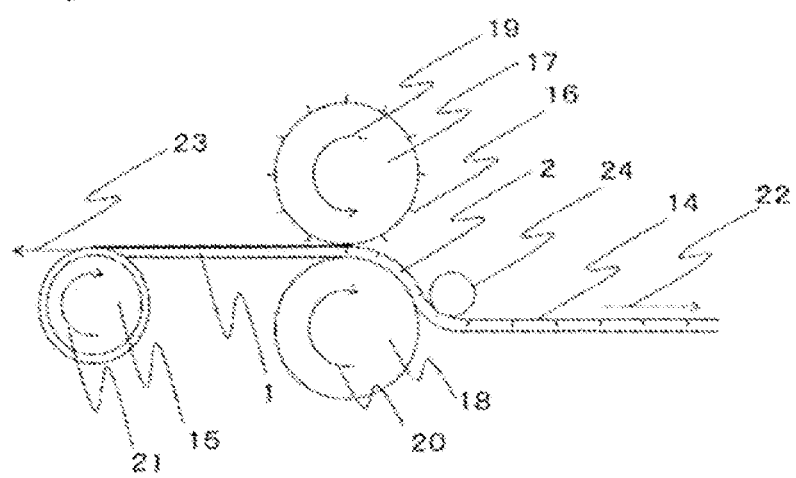
[Fig. 10]

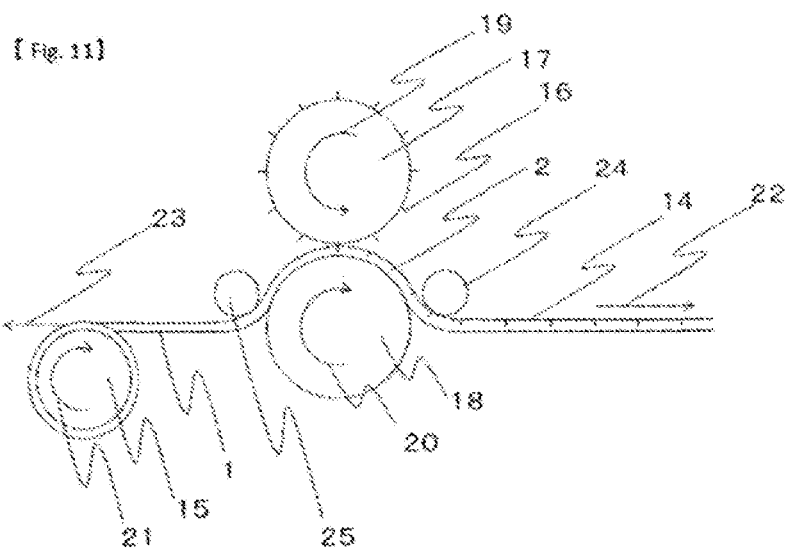
[Fig. 11]
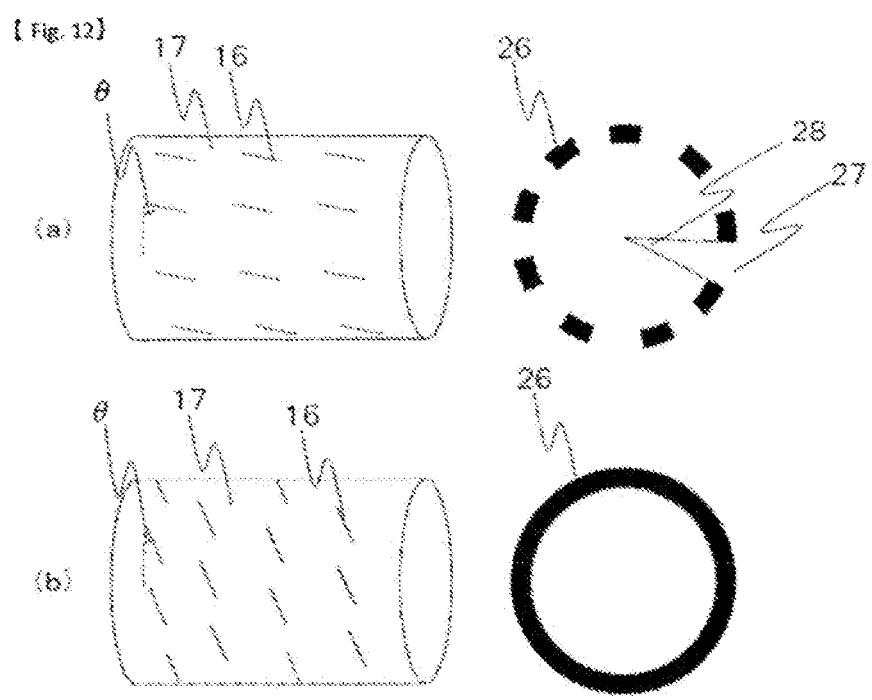
[Fig. 12]

[Fig. 13]
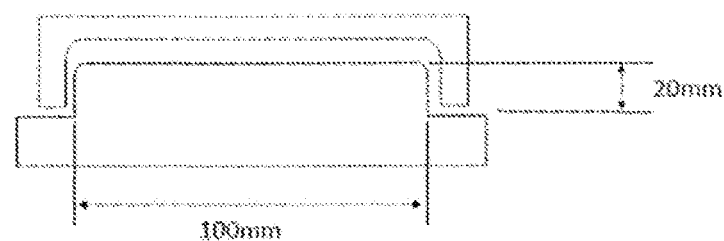
[Fig. 14]
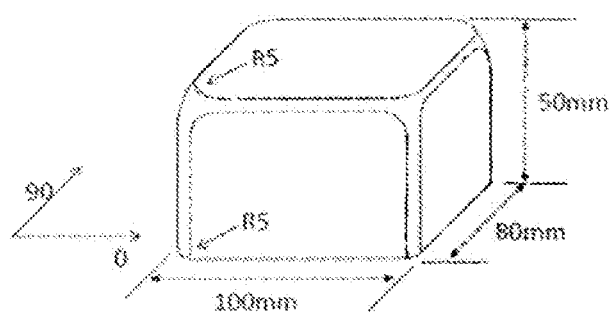

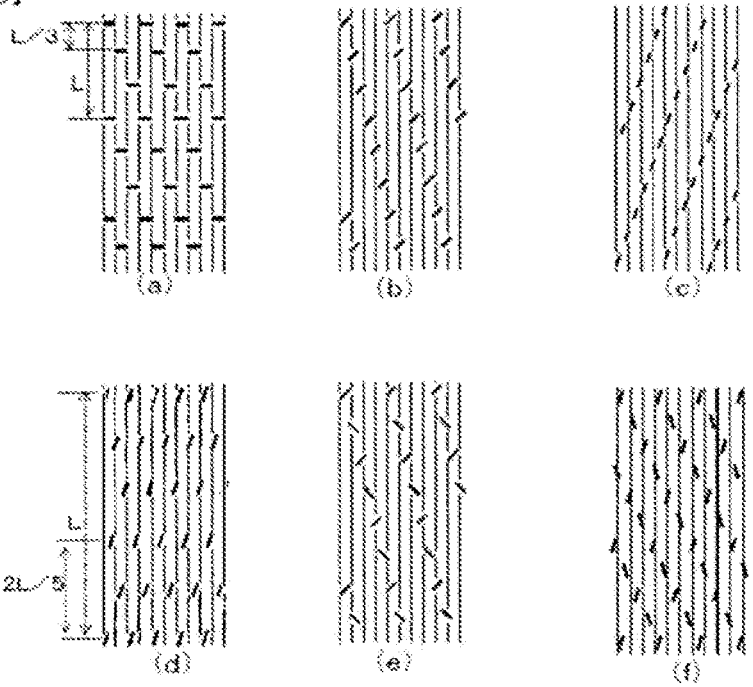
[Fig. 15]
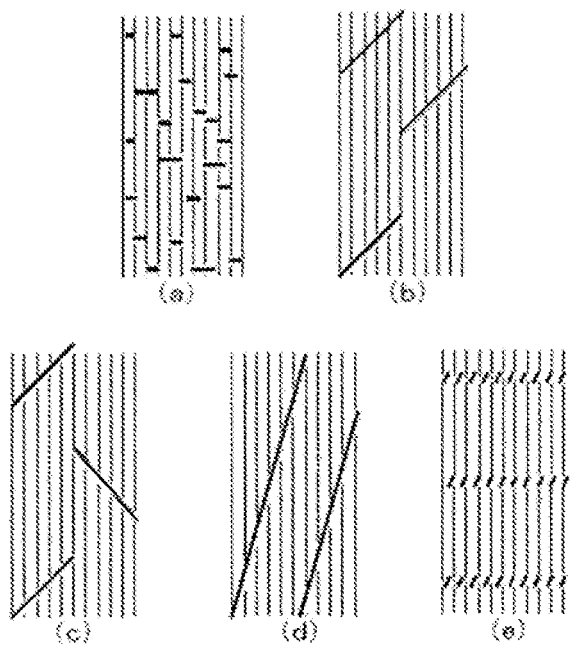
[Fig. 16]

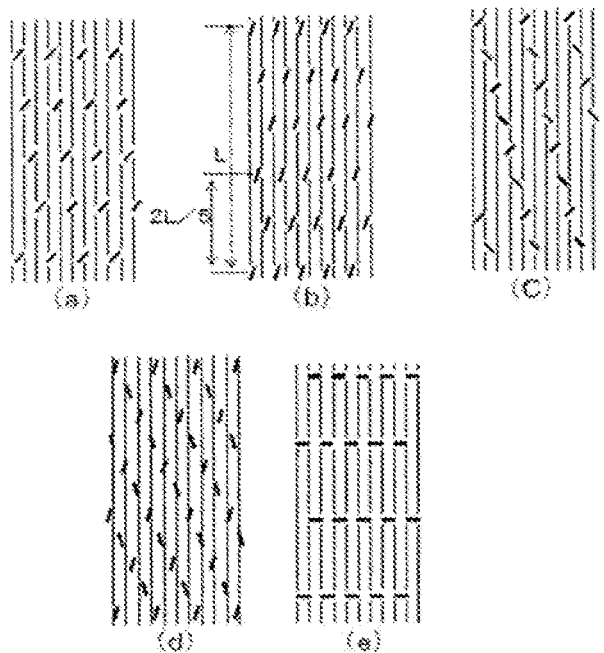
[Fig. 17]
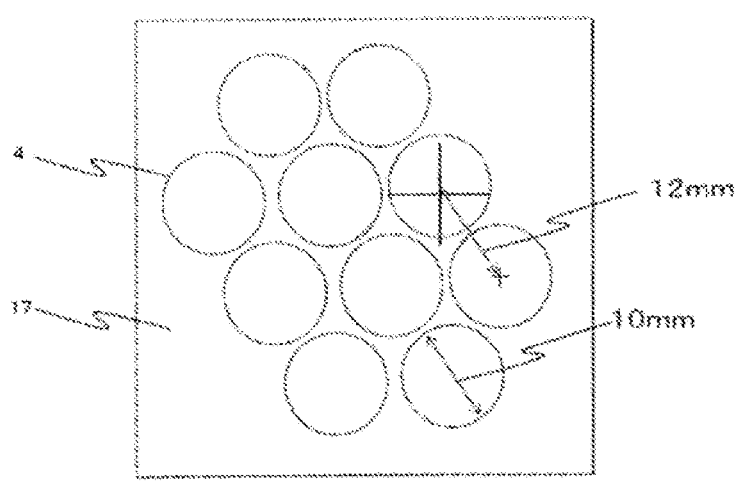
[Fig. 18]

[Fig. 19]
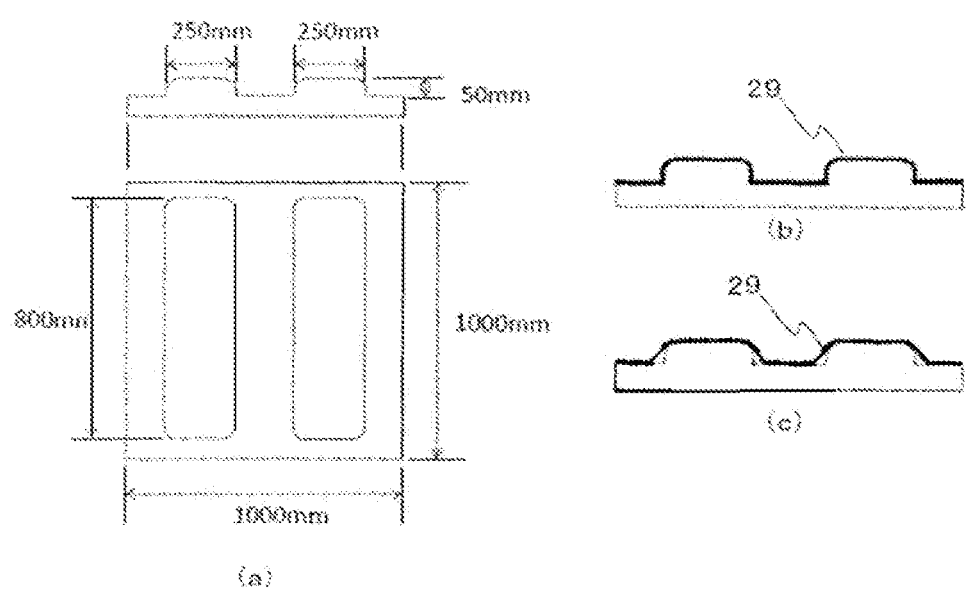

INCISED PREPREG, CROSS-PLY LAMINATE, AND PRODUCTION METHOD FOR INCISED PREPREG

CROSS REFERENCE TO RELATED APPLICATIONS

This is a Divisional Application of U.S. application Ser. No. 15/767,889, filed Apr. 12, 2018, which is the U.S. National Phase application of PCT/JP2016/081170, filed Oct. 20, 2016, which claims priority to Japanese Patent Application No. 2015-210445, filed Oct. 27, 2015, Japanese Patent Application No. 2015-253487, filed Dec. 25, 2015, and Japanese Patent Application No. 2016-051891, filed Mar. 16, 2016, the disclosures of these applications being incorporated herein by reference in their entireties for all purposes.

TECHNICAL FIELD OF THE INVENTION

The present invention relates to an intermediate base material for a fiber reinforced plastic that has good shape conformity when being molded and has high mechanical properties after being solidified and to a production method for the intermediate base material.

BACKGROUND OF THE INVENTION

Fiber reinforced plastics made up of reinforcing fiber and resin are high in specific strength and specific modulus and excellent in mechanical properties as well as having high functional properties in weather resistance, chemical resistance, etc., and accordingly have drawn attention for industrial uses as well. The uses of the fiber reinforced plastics have been expanded to uses as structural members of aircraft, spacecraft, motor vehicles, railways, ships, electric appliances, sports, etc., and demands for them are increasing year by year.

An intermediate base material for a fiber reinforced plastic is an SMC (sheet molding compound). The SMC is a sheet-shaped base material in which, usually, chopped strands cut to about 25 mm and impregnated with a thermosetting resin are randomly dispersed, and is known as a material suitable to mold a fiber reinforced plastic with a complicated three-dimensional shape. However, the fiber reinforced plastic molded from SMC inevitably develops distribution nonuniformity and orientation nonuniformity of the chopped strands, so that the mechanical properties of the molding decrease or the values thereof vary greatly. As a molding method for a fiber reinforced plastic that develops high and stable mechanical properties, there is known a method in which prepregs in which continuous reinforcing fibers are impregnated with a resin are laminated and are molded by autoclave. However, in prepregs that use continuous fibers, their insufficient deformation capability results in occurrence of wrinkles and the bracing of reinforcing fibers, making difficult the molding into a complicated shape such as a three-dimensional shape.

In order to cover defects of the material as described above, an incised prepreg formed by incising a prepreg made up of continuous reinforcing fibers and a resin so as to divide the reinforcing fibers so that the material will be capable of flowing and have a reduced variation of mechanical properties is disclosed (e.g., Patent Documents 1 and 2).

Furthermore, a base material suitable for hand lay-up in which a prepreg is manually laid along a mold surface instead of being formed into a shape by causing the material to flow by heating and pressurizing as is the case with SMC is necessary in some cases in order to obtain a high-quality fiber reinforced plastic. For the hand lay-up using a prepreg, it is common to use a prepreg (woven fabric prepreg) in which a fiber base material (woven fabric) having as a reinforcing configuration a weave structure excellent in formability has been impregnated with a resin (e.g., Patent Document 3).

Furthermore, as a production method for an incised prepreg, there is a method in which an incised prepreg is produced by using a punching die with a blade disposed as in Patent Document 4. However, this is a method that intermittently provides incisions and that has a problem that, in the case of fine incisions, the incisions punched at different timings are likely to deviate in the mutual positional relation. In order for an incised prepreg to develop high mechanical properties, it is important to control the incision position with high accuracy. Therefore, as in Patent Document 5, a production method in which a prepreg is pressed against a rotary blade roll that is provided with blades is proposed.

PATENT DOCUMENTS

Patent Document 1: Japanese Unexamined Patent Publication (Kokai) No. SHO 63-247012
Patent Document 2: International Publication WO2008/099670 Pamphlet
Patent Document 3: Japanese Unexamined Patent Publication (Kokai) No. HEI 8-25491
Patent Document 4: Japanese Unexamined Patent Publication (Kokai) No. 2009-220480
Patent Document 5: Japanese Patent No. 5223354

SUMMARY OF THE INVENTION

The incised prepreg described in Patent Document 1 has greatly improved mechanical properties and reduced variation in comparison with SMC but cannot be said to have a sufficient strength to be applied as a structural member and is provided with a margin for improvement in the conformity to three-dimensional shapes. As for the incised prepreg described in Patent Document 2, finer incisions are provided to develop even higher strength, and the angle of the incisions is made smaller with respect to the fiber direction to make the incisions unlikely to open even after the flow and therefore realize good external appearance. However, the achieved level is still a level at which the molded articles have incision openings that can be visually recognized.

In view of the above-described background art, the present invention is intended to provide an intermediate base material that makes it possible to obtain a fiber reinforced plastic that is excellent in the conformity to three-dimensional shapes and that, when solidified, develops a high level of surface quality at which it is difficult to visually recognize an incision opening and develops excellent mechanical properties.

In hand lay-up, woven fabric prepregs are generally used. On the other hand, with regard to the mechanical properties of cured fiber reinforced plastics, the reinforcing configuration of reinforcing fibers in which unidirectional reinforcing fibers oriented in one direction without undulation in the thickness direction is more excellent than the reinforcing configuration of reinforcing fiber based on a weave structure. Therefore, for products that are desired to have high mechanical properties, it is preferable to carry out the molding by using a prepreg in which reinforcing fibers are oriented in one direction (a unidirectional prepreg). However, the unidirectional prepreg has high stiffness in the fiber direction and therefore cannot be easily stretched in the direction. When the unidirectional prepreg is to be laid along a mold shape that has a three-dimensional shape, reinforcing fibers brace and do not easily conform to the shape in a corner portion. Furthermore, the unidirectional prepreg is bound only by the resin in non-fiber directions and therefore splits when a tensile load acts thereon in a non-fiber direction. Thus, the unidirectional prepreg is unsuitable for hand lay-up. In the case of a laminate of unidirectional prepregs in which a plurality of prepreg sheets are layered with their fiber directions shifted in angle, the splitting of the prepreg reduces but the bracing of reinforcing fibers in a corner portion cannot be eliminated and therefore the shape conformation to a mold having a three-dimensional shape is difficult. Therefore, it is also an object of the present invention to provide a laminate of prepregs that is suitable for hand lay-up and that develops excellent mechanical properties when formed as a fiber reinforced plastic.

With regard to the production method for an incised prepreg, a rotary blade roll is higher in productivity than a punching die, and, in order to maximally utilize the properties of the rotary blade roll, a process in which a prepreg is unwound from a prepreg roll in which a prepreg has been continuously wound around a paper tube or the like, and is incised to form an incised prepreg, which is then wound up as a roll, can be conceived. However, the step in which the prepreg unwound from the prepreg roll is continually incised has a problem that the prepreg gradually deviates in the width direction or slack of the prepreg is dragged in so that wrinkles form. When such a problem occurs, the incised prepreg produced deteriorates in quality; thus, it is difficult to continuously and stably produce an incised prepreg. It is also an object of the present invention to produce an incised prepreg that has excellent moldability and, when solidified, delivers high mechanical properties by reducing the slack of the prepreg and the transverse positional deviation thereof and continually and stably incising the prepreg without forming wrinkles.

In order to solve the foregoing problems, the present invention employs means as follows. Specifically, an incised prepreg for obtaining a fiber reinforced plastic that has high mechanical properties and good surface quality is an incised prepreg that has, in at least a partial region in a prepreg that contains unidirectionally oriented reinforcing fibers and a resin, a plurality of incisions that divide reinforcing fibers, wherein, in the case where a population is made up of the numbers of incisions contained in ten small circular regions of 10 mm in diameter randomly selected in the aforementioned region, a mean value for the population is 10 or greater and a coefficient of variation therefor is within 20%.

A laminate of prepregs suitable for hand lay-up is a cross-ply laminate that includes a plurality of prepregs each of which contains unidirectionally oriented reinforcing fibers and a resin and whose volume fraction Vf of the reinforcing fibers is 45 to 65% and that is configured to include incised prepregs whose fiber directions intersect substantially at right angle, wherein each of the prepregs is an incised prepreg which has a plurality of incisions extending across reinforcing fibers and substantially all the reinforcing fibers of which have a fiber length (L) of 10 to 300 mm, and wherein a tensile property 1 indicated below is satisfied in a 25° C. environment or a tensile property 2 indicated below is satisfied in a 60° C. environment, (tensile property 1) in the case where the fiber direction of one of the incised prepregs in the cross-ply laminate is 0°, load 1×0.5<load 2<load 1×1.5 where the load 1 is a load that occurs in the cross-ply laminate in a 0° direction when a tensile strain of 1% is applied to the cross-ply laminate in the 0° direction and the load 2 is a load that occurs in the cross-ply laminate in the 0° direction when a tensile strain of 2% is applied to the cross-ply laminate in the 0° direction, and (tensile property 2) in the case where the fiber direction of one of the incised prepregs in the cross-ply laminate is 0°, load 1×0.5<load 2<load 1×1.5 where the load 1 is a load that occurs in the cross-ply laminate in the 0° direction when a tensile strain of 1% is applied to the cross-ply laminate in the 0° direction and the load 2 is a load that occurs in the cross-ply laminate in the 0° direction when a tensile strain of 2% is applied to the cross-ply laminate in the 0° direction.

An production method for an incised prepreg is a production method in which while tension is being given to a prepreg that contains reinforcing fibers and a resin, the prepreg is passed through between a rotary blade roll whose total length of blades is within a range of 1 to 3000 m/m$^2$ and a supporting roll proximate to and substantially parallel with an axis of the rotary blade roll in such a manner as to have end sides of the prepreg within a predetermined range in an axis direction of the rotary blade roll so that an incised prepreg is provided with at least one of the reinforcing fibers being divided to a fiber length within a range of 10 to 300 mm.

According to the present invention, an intermediate base material that is excellent in the three-dimensional shape conformity and that develops good surface quality and excellent mechanical properties when formed as a fiber reinforced plastic can be obtained. Furthermore, a cross-ply laminate that is suitable for hand lay-up and that develops excellent mechanical properties when formed as a fiber reinforced plastic can be obtained. Still further, an incised prepreg that delivers excellent moldability and, when solidified, high mechanical properties can be produced by continually and stably incising the prepreg while inhibiting wrinkles and transverse positional deviation.

BRIEF DESCRIPTION OF THE DRAWINGS

FIG. 1 is a conceptual diagram of an incised prepreg of the present invention.

FIG. 2 is a diagram exemplifying an incision pattern (a) that is not homogeneous and incision patterns (b, c) that are homogeneous.

FIG. 3 provides examples of incision patterns for use in the incised prepreg of the present invention.

FIG. 4 provides an example of an incision pattern for use in the incised prepreg of the present invention.

FIG. 5 provides an example of an incision pattern for use in the incised prepreg of the present invention.

FIG. 6 provides an example of an incision pattern for use in the incised prepreg of the present invention.

FIG. 7 is a conceptual diagram of the cross-ply laminate of the present invention.

FIG. 8 is a conceptual diagram of the incised prepreg production method of the present invention.

FIG. 9 is a view of the incised prepreg production method in FIG. 8 viewed from above.

FIG. 10 is a conceptual diagram of the incised prepreg production method of the present invention.

FIG. 11 is a conceptual diagram of the incised prepreg production method of the present invention.

FIG. 12 is a conceptual diagram concerning claim 18.

FIG. 13 illustrates a die for press molding.

FIG. 14 illustrates a die for hand lay-up.

FIG. 15 illustrates six examples of incision patterns for use in the incised prepreg of the present invention.

FIG. 16 illustrates five examples of incision patterns that are not for use in the incised prepreg of the present invention.

FIG. 17 illustrates five examples of incision patterns that were used in examples and comparative examples.

FIG. 18 illustrates a small-area extraction pattern in an incised prepreg in examples.

FIG. 19 illustrates large-size forming dies.

DETAILED DESCRIPTION OF CERTAIN EMBODIMENTS OF THE INVENTION

The present inventors, in order to obtain an intermediate base material that is excellent in the conformity to three-dimensional shapes and, when formed as a fiber reinforced plastic, develops excellent mechanical properties, have eagerly studied and found out that providing at least a partial region of a prepreg that contains unidirectionally oriented reinforcing fibers and a resin with a plurality of incisions that divide reinforcing fibers so that the reinforcing fibers are discontinuous increases the conformity to three-dimensional shapes and therefore solves the foregoing problems.

Concretely, the prepreg is an incised prepreg in which, in the case where a population is made up of the numbers of incisions contained in ten small circular regions of 10 mm in diameter randomly selected in a region provided with a plurality of incisions (hereinafter, referred to as an incised region), a mean value for the population is 10 or greater and a coefficient of variation therefor is within 20% (hereinafter, a state in which the mean value in a population is 10 or greater will be referred to as being highly dense, and a state in which a coefficient of variation is within 20% will be referred to as being homogeneous).

FIG. 1(a) illustrates a conceptual diagram of an incised prepreg that includes an incised region 3 in which a prepreg 1 is provided with a plurality of incisions 2. As long as the incised region is in at least a partial region of the prepreg, the incised region may be present only in a part of the prepreg or may also be present in the entire prepreg and, furthermore, the prepreg may also include a plurality of incised regions. It is also permissible that the incised region be present at any location in the incised prepreg. However, it is preferable that the incised region be present in a region that has a three-dimensional shape, such as a curved surface, protuberances and depressions, etc. when a fiber-reinforced plastic is molded by using incised prepregs. In the incised region, all the reinforcing fibers may be divided by incisions or reinforcing fibers not divided by an incision may be contained.

FIG. 1(b) illustrates a state in which ten circular small regions 4 of 10 mm in diameter have been extracted in an incised region 3 (hereinafter, each circular small region 4 of 10 mm in diameter will be simply termed small region). Although it is preferable that small regions be extracted densely to such a degree that the small regions do not overlap within an incised region, it is permissible to extract small regions so that small regions overlap in the case where the incised region is not sufficient in size to extract ten small regions without anyone of them overlapping another. However, in order to determine the mean value for the population and the coefficient of variation therefor mentioned above with better accuracy, it is impermissible to set a small region beyond the boundary of an incised region. The boundary of the incised region is a group of line segments that is formed by linking line segments that interconnect end portions of incisions so that the group of line segments embraces therein all the incisions and so that the total length of the group of line segments is minimized.

The number of incisions contained in the small region is the total number of incisions present in the small region and incisions that are partially in contact with the outline of the small region. Incidentally, the foregoing mean value for the population and the foregoing coefficient of variation for the population are calculated by expression 1 and expression 2, respectively, where the number of incisions in the ten small regions is ni (i=1 to 10).

[Math. 1]

$$\text{Mean value} = \frac{1}{10}\sum_{i=1}^{10} n_i \quad \text{expression 1}$$

[Math. 2]

$$\text{Coefficient of variation} = \frac{1}{\text{mean value}}\sqrt{\sum_{i=1}^{10}(n_i - \text{mean value})^2} \quad \text{expression 2}$$

As for the number of incisions, increases in the density cause increases in the conformity to three-dimensional shapes and decreases in the opening of each incision at the time of deformation of the incised prepreg, so that when the incised prepreg is formed as a fiber reinforced plastic, good surface quality can be obtained. Furthermore, even if the number of reinforcing fibers that are divided by incisions as a whole remains the same, a load given to a fiber reinforced plastic formed from the incised prepreg results in increased stress concentration around incisions in the case where the incisions are large; however, as the incisions are smaller in size, the stress concentration are less and the mechanical properties more improve.

Therefore, in the case where the numbers of incisions contained in a small region are counted in ten small regions and are determined as a population, it is preferable that the population have a mean value that is 10 or greater. It is further preferable that the mean value of the numbers of incisions be 15 or greater. It is permissible that within a small region, the same reinforcing fiber may be divided by a plurality of incisions. However, in the case where the fiber length L of a reinforcing fiber is less than 10 mm, the post-solidification mechanical properties sometimes deteriorate. Therefore, it is preferable that within each small region, the same reinforcing fiber be not divided by a plurality of incisions. Incidentally, the fiber length L refers to the length of reinforcing fibers divided by a given incision and the most proximate incision in the reinforcing fiber direction (the incision that makes a pair with the given incision) as illustrated in FIG. 2(a) to (c). In the case where the mean value for the population is larger than 50, the possibility that the same reinforcing fiber is divided by a plurality of incisions in a small region is high. Therefore, it is preferable that the mean value for the population be 50 or less. On another hand, as the incisions are more homogeneously distributed in each incised region, the variation of the openings of the individual incisions at the time of deformation of the incised prepreg is smaller, leading to development of more stable mechanical properties when the incised prepreg is formed as a fiber reinforced plastic. Therefore, it is preferable that the coefficient of variation for the population be 20% or less. The coefficient of variation is further preferably 15% or less. Incidentally, regarding a small region extracting method, it is preferable that small regions be extracted so that the small regions be present relatively close to each other as illustrated in FIG. 1 (b). The coefficient of variation fluctuates in some cases, depending on the extraction pattern. In such cases, the coefficient of variation is measured five times with different extraction patterns and, if four or more of the measured coefficients of variation are 20% or less, it is considered that a mode of the present invention is satisfied.

A concept of providing relatively small incisions is already mentioned in Patent Document 2. However, for example, in the case where the incision pattern mentioned in FIG. 2 in Patent Document 2 is made larger or smaller so that the mean value for the population is 10 or greater, the fiber length of reinforcing fibers inevitably becomes 10 mm or less. In the case where the fiber length of reinforcing fibers is 10 mm, the mean value for the population is 5 or less, that is, the density of distribution of incisions is small.

Furthermore, in many existing incision patterns represented by FIG. 1(A) in Patent Document 1, intermittent incisions are provided by shifting adjacent incisions by a length L/2 that is half the length L of the reinforcing fibers as illustrated in FIG. 2 (a) (A drawing mentioned without a specified document is a drawing in this description document. The same will apply hereinafter). In the case of such an incision pattern, as the length of incisions is shorter and the fiber length is longer, incisions are more likely to be present on straight lines that are present at intervals of L/2 in the orientation direction of the reinforcing fibers and therefore the variation in the population is greater. In such a case, incision openings concentrate on the aforementioned straight lines and openings conspicuously appear. By shifting adjacent incisions by short repeat periods, such as L/5 or L/6, instead of L/2, as in FIG. 2(b), an incision pattern in which incisions are more evenly distributed in the incised prepreg is provided, so that when the incised prepreg stretches, the incised prepreg can homogeneously deform without localization of sites of stretch and therefore the opening of the individual incisions is restrained (hereinafter, an incision pattern in which incisions are evenly distributed will sometimes be termed homogeneous incision pattern). Furthermore, instead of the stepwise shifting of mutually adjacent incisions as in FIG. 2(b), the shifting as in FIG. 2(c) may also be adopted. In FIG. 2(c), incisions are shifted by a repeat period of L/10, and the distance between end portions of mutually adjacent reinforcing fiber bundles that are divided by incisions (e.g., between an incision s1 and an incision s2 in FIG. 2(c)) is 2 L/5, that is, longer than L/5 in FIG. 2 (b). Because the distance between end portions of mutually adjacent reinforcing fiber bundles is long, effect of inhibiting the linked occurrence of crack advancement and incision opening is obtained and therefore both mechanical properties and surface quality improve. In the case of FIG. 2(a), although the distance between end portions of mutually adjacent reinforcing fiber bundles is as long as L/2, the distances between two incisions across a reinforcing fiber bundle is short, so that the two incision openings likely to result in overlap of stress concentration portions, which is not preferable in terms of mechanical properties.

It is preferable that the length of the reinforcing fibers after division be 15 mm or greater and, further preferably, 20 mm or greater. Even in the case where the length of reinforcing fibers is 20 mm or greater, reduction of the number of reinforcing fibers that are divided by each incision can achieve an incision pattern in which the incisions are distributed with high density (hereinafter, sometimes termed highly dense incision pattern), so that the reinforcing fibers being long and, in addition, the incisions being small make it possible to expect an advantageous effect of improving mechanical properties. By shifting adjacent incisions by a small repeat period as in FIG. 2(b), it is possible to realize a homogeneous and highly dense incision pattern while maintaining a fiber length. This applies to cases where incisions are provided obliquely to the orientation direction of reinforcing fibers.

As a mode of the incised prepreg of the present invention, it is preferable that a given incision A and another incision B most proximate to that incision not divide the same reinforcing fiber. The reinforcing fibers divided by most proximate incisions are relatively short reinforcing fibers and therefore become a factor that reduces the mechanical properties when the incised prepreg is formed as a fiber reinforced plastic. Besides, when between the incision A and its most proximate incision B there exists reinforcing fibers that are not divided by either the incision A or the incision B, the incised prepreg, when formed as a fiber reinforced plastic, is less likely to have the incision A and the incision B interconnected due to damage and therefore achieves improved mechanical properties.

FIG. 3 illustrates a portion of an incised region in which a plurality of reinforcing fibers 5 exist between an incision A and its most proximate incision B and the incision A and incision B do not divide the same reinforcing fiber. As in FIG. 3(a), reinforcing fibers 5 between the incision A and the incision B may be divided by an incision C that is not most proximate to the incision A or the incision B. Alternatively, as in FIG. 3(b), it is permissible that reinforcing fibers 5 between the incision A and the incision B not be divided by any incision. It is preferable that the distance between incisions most proximate to each other, in a direction perpendicular to the reinforcing fiber, be at least 0.5 time a projected length Ws of the incisions projected on a plane perpendicular to the reinforcing fibers and, more preferably, at least 1 time as long as Ws.

In an incised prepreg in which incisions are highly densely distributed, if the distances between incisions are short so that incisions most proximate to each other divide the same reinforcing fiber, there is possibility of very short reinforcing fibers being contained. Therefore, by providing most proximate incisions with such intervals that the most proximate incisions do not divide the same reinforcing fiber, even a highly dense incision pattern can be inhibited from having short reinforcing fibers contained and can be allowed to develop stable mechanical properties.

As a preferred mode of the incised prepreg of the present invention, an incised prepreg as in FIG. 4 in which the incisions have substantially the same length Y (hereinafter, Y will be referred to also as incision length) and the distance 6 between incisions most proximate to each other is longer than 0.5 time Y can be cited. Note that substantially the same length refers to all the incision lengths being within ±5% from the mean value of all the incision lengths (which will apply hereinafter in the same manner). Incidentally, in the present invention, the incisions may be linear or curved and, in either case, the line segment connecting end portions of incisions represent an incision length Y.

The distance between incisions most proximate to each other means the shortest distance between the incisions most proximate to each other. In the case where the distance between incisions most proximate to each other is short, damage formed in a fiber reinforced plastic will likely interconnect incisions; therefore, it is preferable that the distance between incisions most proximate to each other be greater than 0.5 time the incision length Y. The distance between incisions most proximate to each other is more preferably at least 0.8 time Y and, further preferably, at least 1.0 time Y. On the other hand, the distance between incisions most proximate to each other do not have a particular upper limit. However, in providing a prepreg with highly dense incisions, it is not easy to make the distance between incisions most proximate to each other at least 10 times the incision length Y.

As for an incised prepreg that has incisions distributed highly densely, the conformity to three-dimensional shapes will improve and small sizes of the individual incisions will make it possible to expect improvements in mechanical properties. The improvements in mechanical properties will be greater in the case where the incisions are remote from each other than in the case where the incisions are closer to each other in distance. Therefore, in the case where incisions are densely provided, an incision pattern in which the incisions are spaced in distance from each other is particularly important, more specifically, it is particularly important that the distance between incisions most proximate to each other be longer than 0.5 time the incision length Y, in order to improve mechanical properties. Furthermore, in the case of an incised prepreg in which all the reinforcing fibers are divided within an incised region so as to improve the formability, the shortest distance between incisions most proximate to each other being longer than 0.5 time the incision length Y and the incisions most proximate to each other not dividing the same reinforcing fiber will develop as best mechanical properties as possible without impairing the conformity to three-dimensional shapes or the surface quality.

As a preferred mode of the incised prepreg of the present invention, an incised prepreg in which incisions are provided obliquely to the orientation direction of reinforcing fibers can be cited. In the case where incisions are curved, it is indicated that line segments interconnecting end portions of the incisions are oblique to the orientation direction of reinforcing fibers. Having the incisions oblique to the orientation direction of reinforcing fibers will improve the conformity of the incised prepreg to three-dimensional shapes and the mechanical properties of a fiber reinforced plastic formed from the incised prepreg. Where the angle between incisions and the orientation direction of reinforcing fibers is $\theta$, it is preferable that $\theta$ be 2 to 60°. In particular, the absolute value of $\theta$ being 25° or less conspicuously improves mechanical properties and, particularly, the tensile strength. From this viewpoint, it is preferable that the absolute value of $\theta$ be 25° or less. On the other hand, if the absolute value of $\theta$ is smaller than 2°, it becomes difficult to stably provide incisions. Specifically, if the incisions lie in a direction more similar to the orientation of reinforcing fibers, reinforcing fibers are more likely to escape from a blade when the blade is used to provide incisions and therefore it becomes difficult to provide incisions while securing a positional accuracy of incisions. From this viewpoint, it is preferable that the absolute value of $\theta$ be 2° or greater.

Not only in the case where incisions are highly densely distributed but also in the case where the smaller the absolute value of $\theta$, the more improvement in mechanical properties can be expected and where, in particular, all the reinforcing fibers in the incised region are divided, there is a concern that incisions are near to each other and damages that occur in incisions are likely to join together, so that there is a concern that mechanical properties may deteriorate. However, since a given incision and another incision most proximate to that incision do not divide the same reinforcing fiber and since the incisions have substantially the same length of Y and the distance between incisions most proximate to each other is longer than 0.5 time Y, further improvements in mechanical properties can be expected in comparison with the case where incisions are perpendicular to the orientation direction of reinforcing fibers. In the case where incisions are highly dense, in particular, improvements in mechanical properties and improvements in surface quality due to the restrained opening of the incisions can be expected. As represented by Patent Document 2, providing incisions obliquely to reinforcing fibers is a known technology. In an incision pattern in which adjacent incisions are shifted from each other by L/2 relative to the fiber length L of reinforcing fibers as in FIG. 2(f) and FIG. 12 in Patent Document 2, the case where L is long so that the length of the incisions is short fails to achieve a homogeneous incision pattern, in substantially the same manner as the phenomenon illustrated in FIG. 2, so that when the incised prepreg is stretched, a site with densely distributed incisions is likely to stretch and so that when the incision prepreg is formed as a fiber reinforced plastic, the incisions existing close to each other makes likely the juncture of incisions. Thus, in some cases, mechanical properties deteriorate. By applying oblique incisions to a homogeneous incision arrangement as in FIG. 2 (b) and FIG. 2(c), the mechanical properties-improving effect achieved by providing incisions obliquely can be more effectively achieved.

As a preferred mode of the incised prepreg of the present invention, an incised prepreg in which the absolute values of the angles $\theta$ formed between incisions and the orientation direction of reinforcing fibers are substantially the same and incisions whose $\theta$ is positive (referred to as positive incisions) and incisions whose $\theta$ is negative (referred to as negative incisions) are included can be cited. The absolute values of $\theta$ being substantially the same means that the absolute values of the angles $\theta$ of all the incisions are within the range of ±1° from the mean value determined from the absolute values of the angles $\theta$ of all the incisions. Providing not only the positive incisions within the incised prepreg but also negative incisions therein makes it possible to macroscopically restrain shearing deformation in plane and stretch the incised prepreg due to shearing deformation occurring in the opposite direction in the vicinity of negative incisions in the case where when the incised prepreg is stretched, in-plane shearing deformation occurs in the vicinity of positive incisions.

Further preferably, the incised prepreg is an incised prepreg that has substantially equal numbers of positive incisions and negative incisions. Having substantially equal numbers of positive incisions and negative incisions means that the number of incisions whose $\theta$ is positive and the number of incisions whose $\theta$ is negative are substantially equal. Further, the number of incisions whose $\theta$ is positive and the number of incisions whose $\theta$ is negative being substantially equal is assumed to mean that when expressed in percentage based on number, both the number of angles $\theta$ that are positive and the number of angles $\theta$ that are negative are greater than or equal to 45% and less than or equal to 55% (the same will apply hereinafter).

By disposing positive incisions and negative incisions alternately with each other as in FIG. 5, a distance between proximate incisions can be easily secured while incisions are highly densely provided. In conjunction with lamination of incised prepregs obtained, incised prepregs that have only positive incisions or only negative incisions have different directions of the incisions when the prepregs are seen from the obverse side or from the reverse side even in the case where the prepregs have the same orientation direction of reinforcing fibers. Therefore, at the time of production of a fiber reinforced plastic, there is a possibility of increasing labor for controlling the procedure of lamination so that all the prepregs have the same direction of incisions or so that equal numbers of prepregs that are different in the direction of incisions but are the same in the direction of reinforcing fibers are laminated. Therefore, an incision pattern in which the absolute values of the angles θ between the incisions and the orientation direction of the reinforcing fibers are substantially the same and the positive incisions and the negative incisions are substantially equal in number will enable lamination in substantially the same manner as common continuous fiber prepregs.

In the case of an incised prepreg in which positive incisions and negative incisions are present in substantially equal numbers and which has an incision pattern in which the positive incisions and the negative incisions are uniformly mixed, it becomes easier to create an incision pattern in which a given incision and another incision most proximate to that incision do not divide the same reinforcing fiber and the distance between incisions most proximate to each other is longer than 0.5 time Y, particularly in the case where the incisions are distributed highly densely. This makes it possible to inhibit junction of damages occurring at incisions and therefore improve mechanical properties. Furthermore, in the case where positive incisions and negative incisions are present, openings of incisions are less likely to be discovered even when the incised prepreg is stretched, and good surface quality can be obtained when such prepregs are formed as a fiber reinforced plastic. When the incision distribution is highly dense, the incisions become even finer and can achieve even better surface quality. This incision pattern is effective also in the case where all the reinforcing fibers within the incised region are divided. The incision pattern will maintain the conformity to three-dimensional shapes and, at the same time, can improve mechanical properties and the surface quality.

The incised prepreg is further preferably an incised prepreg in which, as for the interval between a given incision and another incision that is present on an extended line of that incision and that is most proximate to that incision, the intervals between positive incisions and the intervals between negative incisions are different in length from each other. FIG. 6 illustrates an incised prepreg in which positive incisions and negative incisions are provided in substantially equal numbers. The positive incisions are disposed on straight lines 9 and negative incisions are disposed on straight lines 10 and the intervals between the positive incisions on the straight lines 9 are smaller than the intervals between the negative incisions on the straight lines 10. This arrangement of incisions allow securement of a distance between proximate incisions with homogeneity and high density and makes it possible to create an incision pattern in which incisions most proximate to each other do not divide the same reinforcing fiber. Furthermore, with regard to the interval between a given incision and another incision that is present on an extended line of that incision and that is most proximate to that incision, this arrangement of incisions makes it possible to have the length of reinforcing fibers longer than an arrangement in which the intervals between positive incisions and the intervals between negative incisions are the same in length and makes it possible to maintain mechanical properties even when incisions are distributed highly densely. Incidentally, an incision being present on an extended line of an incision means that the angle between a straight line extending from an incision and a straight line connecting most proximate points on the incisions concerned is within 1°.

With regard to the interval between a given incision and another incision that is present on an extended line of that incision and that is most proximate to that incision, when an incision pattern in which the intervals between positive incisions and the intervals between negative incisions are different in length is adopted, the length of reinforcing fibers can be made longer despite high density and, furthermore, in the case where all the reinforcing fibers within the incised region are divided, too, a given incision and another incision most proximate to that incision do not divide the same reinforcing fiber, and it becomes easier to obtain an incision pattern in which the distance between incisions most proximate to each other is longer than 0.5 time the incision length Y. This makes it possible to more effectively improve mechanical properties without impairing the surface quality and the conformity to three-dimensional shapes. Specifically, an incision pattern in which positive incisions and negative incisions are provided in substantially equal numbers, and in which, as for the interval between a given incision and another incision that is present on an extended line of that incision and that is most proximate to that incision, the intervals between the positive incisions and the intervals between the negative incisions are different in length, and in which a given incision and another incision most proximate to that incision do not divide the same reinforcing fiber, and in which the distance between incisions most proximate to each other is longer than 0.5 time the incision length Y, and in which substantially all the reinforcing fibers in the incised region are divided into fiber lengths of 15 mm or greater is particularly preferable from the viewpoint of the three-dimensional shape conformity, the surface quality, and the mechanical properties. As in FIG. 1, FIG. 2(d), and FIG. 14 (d) in Patent Document 2, incision patterns in which positive incisions and negative incisions are provided are known. All these incision patterns, as in FIG. 2(a) in this description, are an incision pattern in which adjacent incisions are shifted by half the fiber length L of the reinforcing fibers, and are such that the longer the fiber length L and the smaller the incisions, the more likely it is that dense and sparse arrangements of incisions will occur. By shifting adjacent incisions not exclusively by L/2 as in FIG. 2(b) and FIG. 2(c), a highly dense and homogeneous incision pattern can be achieved.

Furthermore, with regard to the production method for an incised prepreg described below, a mode in which a protective sheet (corresponding to a sheet substrate B) is pasted to a surface of an incised prepreg and the prepreg is provided with incisions penetrating the protective sheet so that adherence between a rotary blade roll and the incised prepreg is inhibited is indicated. When incised prepregs thus produced are to be laminated, it is necessary to peel the protective sheets. If the distance between incisions most proximate to each other is short, there are cases where when the protective sheet is peeled, the protective sheet tears and the handleability deteriorates. Therefore, from the viewpoint of the handleability of incised prepreg sheets as well, it is preferable that the distance between incisions most proximate to each other be longer than 0.5 time the incision length Y. In the case where substantially equal numbers of positive incisions and negative incisions are arranged in a mixed manner, the incisions in the protective sheet are less likely to join when the protective sheet is peeled, so that the handleability of the incised prepreg sheet further improves. With regard to the interval between a given incision and another incision that is present on an extended line of that incision and that is most proximate to that incision, the case where the intervals between positive incisions and the intervals between negative incisions are different in length allows the positive incisions and the negative incisions to be more uniformly arranged, so that the protective sheet is less likely to be torn off and therefore the handleability of the incised prepreg further improves. Incidentally, as representative materials of the protective sheet, polymers, such as polyethylene and polypropylene, are cited. The protective sheet plays a role of preventing the resin from sticking to blades when the blades are used to provide incisions in the prepreg and also a role of protecting the incised prepreg surface from extraneous matters, such as dust, when the incised prepreg is stored.

In the present invention, the resin contained in the incised prepreg may be a thermoplastic resin or a thermosetting resin. As the thermoplastic resin, for example, polyamide (PA), polyacetal, polyacrylate, polysulphone, ABS, polyester, acryl, polybutylene terephthalate (PBT), polycarbonate (PC), polyethylene terephthalate (PET), polyethylene, polypropylene, polyphenylene sulfide (PPS), polyether ether ketone (PEEK), polyether imide (PEI), polyether ketone ketone (PEKK), liquid crystal polymer, polyvinyl chloride, fluorine-based resins, such as polytetrafluoroethylene, silicone, etc. can be cited. As for the thermosetting resin, it suffices that the thermosetting resin undergoes crosslink reaction due to heat to form at least a partial three-dimensional crosslink structure. As such thermosetting resins, unsaturated polyester resin, vinyl ester resin, epoxy resin, benzoxazine resin, phenol resin, urea resin, melamine resin, polyimide resin, etc. can be cited. Resins obtained by modifying these resins or blending two or more species thereof can also be used. Furthermore, these thermosetting resins may be resins that self-cure by heat or may also be resins that contain a curing agent, a cure accelerating agent, etc.

The reinforcing fiber contained in the incised prepreg of the present invention may be glass fiber, Kevlar fiber, carbon fiber, graphite fiber, boron fiber, etc. Among these, carbon fiber is preferable, from the viewpoint of specific strength and specific elastic modulus.

When the volume fraction Vf of the reinforcing fibers is 70% or less, the shifting of reinforcing fibers occurs at incised portions so that the bridging is effectively inhibited. Thus, shape conformity and an effect of inhibiting molding deficiency, such as void, can be obtained. From this viewpoint, it is preferable that Vf be 70% or less. Furthermore, as Vf is lower, the bridging can be more inhibited. However, if Vf is less than 40%, high mechanical properties required for structural materials are less likely to be obtained. From this viewpoint, it is more preferable that Vf be 40% or greater. A more preferable range of Vf is 45 to 65% and, further preferably, 50 to 60%.

The incised prepreg may be produced by using a prepreg whose reinforcing fibers have been partially impregnated with resin (i.e., have been partly left unimpregnated). When an incised prepreg whose reinforcing fibers have been partially impregnated with resin is used, the unimpregnated portions of the reinforcing fibers within the prepreg become in-plane flow paths so that the air confined between layers of incised prepregs at the time of lamination thereof and gases such as volatile components from the incised prepregs are easily discharged to the outside of the incised prepregs (such flow paths of gases as these are called degassing path). On the other hand, when the impregnation ratio is excessively low, there are cases where the ease of operation becomes unfavorable, for example, detachment occurs between reinforcing fibers and the resin and the incised prepreg breaks into two parts at an unimpregnated portion at the time of lamination of incised prepregs, there are cases where if the impregnation time during molding is not long, voids remain, and so on. Therefore, it is preferable that the impregnation ratio be 10 to 90%. From this viewpoint, a more preferable upper limit of the range of the impregnation ratio is 70%, and a further preferable upper limit is 50%, and a more preferable lower limit of the range of the impregnation ratio is 20%.

In the incised prepreg of the present invention, a resin layer may be present in a surface thereof. As a resin layer is present in a surface of the incised prepreg, an inter-layer resin layer is molded between incised prepregs when the incised prepregs are laminated. Therefore, when an out-of-plane impact load acts, crack is induced in a soft inter-layer resin layer and the presence of the thermoplastic resin achieves high toughness, inhibiting the detachment, so that the residual compressive strength subsequent to the out-of-plane impact can be increased. Thus, this incised prepreg is suitable as materials of main structures with high safety requirements for aircrafts and the like.

Furthermore, the incised prepreg of the present invention, in any one of the foregoing modes, can be preferably used as a cross-ply laminate in a mode as illustrated below which is provided by laminating incisions prepregs prior to being molded.

Incised prepregs, similar to SMC, can be used for press molding. The present inventors have also found out that a base material suitable for manual forming (hand lay-up) can be obtained by preparing a cross-ply laminate obtained by laminating a plurality of incised prepregs each of which contains unidirectionally oriented reinforcing fibers and a resin and whose volume fraction Vf of the reinforcing fibers is 45 to 65% and each of which has a plurality of incisions extending across reinforcing fibers and substantially all the reinforcing fibers of which have a fiber length (L) of 10 to 300 mm so as to include incised prepregs whose reinforcing fibers' orientation directions (fiber directions) intersect substantially perpendicularly and making the cross-ply laminate have a tensile property mentioned below.

Normally, reinforcing fibers are high in stiffness in the fiber direction and are hard to stretch in that direction. However, by dividing reinforcing fibers by incisions, the stretching in the fiber direction of the incised prepreg is made possible. By preparing the cross-ply laminate in which incised prepregs have been laminated, the incised prepregs in the individual layers are inhibited from being ripped when the incised prepregs receive load in a non-fiber direction. The configuration in which the incised prepregs laminated so as to include incised prepregs whose fiber directions intersect substantially at right angle restrain each other is a configuration similar to a woven fabric whose warp and weft restrain each other and which can be stretched in ±45° directions in which the reinforcing fibers are not oriented and therefore are excellent in formability. Since a formability comparable to that of a woven fabric can be expected, the lamination into a cross-ply (lamination such as to include incised prepregs whose fiber directions intersect substantially at right angle) is preferable. All that is required is that incised prepregs cut out into squares of the same size be rotated 90° and laminated; therefore, lamination is simple and easy. Incidentally, the fiber direction being substantial at right angle means that the fiber direction is within the range of 90°±10°.

With regard to the cross-ply laminate in which a plurality of incised prepregs are laminated so as to include incised prepregs whose fiber directions intersect substantially at right angle, the number of incised prepregs that are laminated is not particularly limited; for example, the laminate configuration may be [0/90] or [0/90]2 or may be a configuration in which the numbers of incised laminates of 0° and 90° are different as in [0/90/0]. A cross-ply laminate in which incised prepregs of different incision providing methods (incision patterns) have been laminated is also permissible. The cross-ply laminate is less easily stretchable as the cross-play laminate is thicker. Therefore, it is preferable that the post-lamination thickness be less than 1 mm.

Incidentally, in the present invention, substantially all the reinforcing fibers being divided into a fiber length L=10 to 300 mm means that in each incised prepreg in a cross-ply laminate, the total of volumes of reinforcing fibers outside the range of L=10 to 300 mm is greater than or equal to 0% and less than or equal to 10% with respect to the volume of the incised prepreg.

If the volume fraction Vf of the reinforcing fibers of each incised prepreg is 65% or less, the reinforcing fibers shift at incised portions, and shape conformity can be obtained, and a sufficient amount of resin to inhibit the lack of resin in a surface which occurs during molding can be secured. From this viewpoint, it is preferable that Vf be 65% or less. Furthermore, as Vf is lower, the effect of stretch in the fiber direction is higher. However, when Vf is less than 45%, high mechanical properties required for structural materials are less easily obtainable. From this viewpoint, it is preferable that Vf be 45% or higher.

Since the escape of reinforcing fibers occurs when incisions are provided, relatively long incisions are sometimes intentionally provided in an incised prepreg, so that it sometimes happens that reinforcing fibers having a shorter fiber length than most lengths L are present in the incised prepreg. It is preferred that the volume percentage of such reinforcing fibers be less than 5% of the volume of the incised prepreg. Furthermore, because of small differences in the fiber direction at the time of provision of incisions in each incised prepreg or degradation of an apparatus that provides incisions or the like, reinforcing fibers not provided with an incision or reinforcing fibers whose L exceeds 300 mm are present in some cases. It is preferred that the volume percentage of such reinforcing fibers be less than 5% of the volume of the incised prepreg. Pairs of incisions causing substantially all the reinforcing fibers to have lengths within a predetermined fiber length range (10 to 300 mm) leads to the conformity to three-dimensional shapes and prevention of bridging.

If reinforcing fibers divided by incisions have a length L of 300 mm or less, the probability of presence of an incision in the fiber direction of the cross-ply laminate is increased, so that improvement in the shape conformity to fine protuberances and depressions can be realized. If L is 10 mm or greater, the distance between incisions is long. Therefore, when a fiber reinforced plastic molded by using such incised prepregs receive a load, cracks are less likely to join, so that strength increases. In view of a relation between the shape conformity during molding and the mechanical properties of a molded fiber reinforced plastic, a more preferable range of L is 10 to 300 mm. As a concrete arrangement of incisions, there is not a particular limitation. A homogeneous and highly dense incision pattern mentioned above may be adopted. If a highly dense and homogeneous incision pattern is used, it is possible to mold from a preform obtained by hand lay-up a fiber reinforced plastic that has a good surface quality with incision openings being substantially invisible and that has even higher mechanical properties.

In the present invention, it is preferable that in the case where the fiber direction of one of the incised prepregs in the cross-ply laminate at room temperature, that is, in a 25° C. environment, is 0°, load 1×0.5<load 2<load 1×1.5 (tensile property) be satisfied where the load 1 is a load that occurs in the cross-ply laminate in a 0° direction when a tensile strain of 1% is applied to the cross-ply laminate in the 0° direction and the load 2 is a load that occurs in the cross-ply laminate in the 0° direction when a tensile strain of 2% is applied to the cross-ply laminate in the 0° direction in a 25° C. environment.

FIG. 7 is a conceptual diagram of a cross-ply laminate in which two layers of incised prepregs 14 are laminated, where the fiber direction of the upper incised prepreg is a 0° direction 11. When the cross-ply laminate is formed by pressing it against a mold by hand lay-up, the cross-ply laminate can be most easily stretched in a 45° direction 13 but it is difficult to form a shape while stretching it only in the 45° direction 13. When the cross-play laminate is formed while stretching it in a direction closer to the 0° direction 11 than to the 45° direction 13, the cross-play laminate more easily stretches in that direction as it is more easily stretchable in the 0° direction 11. Therefore, the easy stretchability of the cross-ply laminate in the 0° direction 11 is an index of the easy formability of the cross-ply laminate. In the case where the cross-ply laminate is shaped while being stretched in a direction closer to the 90° direction than to the 45° direction 13, the easy stretchability of another incised prepreg of the cross-ply laminate in the 0° direction 12 is an index of the easy formability of the cross-ply laminate.

Incidentally, as for the cross-ply laminate of the present invention, it is important that in the case where the fiber direction of one of the incised prepregs in the cross-ply laminate is 0°, the foregoing tensile property (load 1×0.5<load 2<load 1×1.5) be satisfied. For example, as long as the foregoing tensile property is satisfied in the case where the fiber direction of an upper-side incised prepreg is the 0° direction 11, this mode is encompassed by the cross-ply laminate of the present invention even if the tensile property is not satisfied in the case where the fiber direction of a lower-side incised prepreg is the 0° direction (i.e., in the case where the 90° direction 12 with respect to the fiber direction of the upper-side incised prepreg is the 0° direction). Particularly preferable in the cross-ply laminate of the present invention is a mode that satisfies the foregoing tensile property (load 1×0.5<load 2<load 1×1.5) in the 0° direction and the 90° direction in the case where the fiber direction of one of the incised prepregs of the cross-ply laminate is 0°, that is, a mode that satisfies the foregoing tensile property (load 1×0.5<load 2<load 1×1.5) in the 0° direction in the case where the fiber directions of all the incised prepregs in the cross-ply laminate are 0°.

It is referable that during hand lay-up, in the 0° direction of the incised prepreg, the strain in the 0° direction stretch by 1% or greater. However, if stretch continues as elastic deformation, shrinkage occurs after a shape is formed, so that the shape cannot be retained in some cases or the load needed for forming a shape increases in some cases. Therefore, it is preferable that the tensile property of the cross-ply laminate in the 0° direction be nonlinear and that the cross-ply laminate have a property of the elastic modulus gradually decreasing. That is, it is preferable that load 2<load 1×1.5. Furthermore, if the strain in the 0° direction in the cross-ply laminate is 2% or less and the cross-ply laminate has a property of being divided with one or more incisions being start points, there are cases where while being formed the cross-ply laminate tears. Therefore, it is preferable that as for the tensile property of the cross-ply laminate in the 0° direction, the strain in the 0° direction be between 1 and 2% and load not decrease extremely. Specifically, it is preferable that load 2>load 1×0.5. A more preferable range of the tensile property is load 1×0.7<load 2<load 1×1.3. Furthermore, even with incisions provided and substantially all the reinforcing fibers having been cut, a cross-ply laminate where the load 1 be greater than or equal to 50 N per 1 mm width of the cross-ply laminate is good in handleability due to high stiffness of the cross-ply laminate, and therefore is preferable. On the other hand, if the load 1 is excessively large, the cross-ply laminate cannot be easily stretched by human power and is sometimes not suitable for hand lay-up even in the case where load 1×0.5<load 2<load 1×1.5 is satisfied. Therefore, it is preferable that the load 1 be 300 N or less per 1 mm width of the cross-ply laminate.

The measurement of the load 1 and the load 2 may use tensile test pieces having an oblong shape cutout from a cross-ply laminate, and a tensile tester may be used to give tensile strain. Strain can be measured by a method that uses a non-contact strain measuring instrument described in Examples.

In the present invention, it is preferable, from the viewpoint of the surface quality of the fiber reinforced plastic, that in the case where the fiber direction of one of the incised prepregs of a cross-ply laminate is 0°, when a tensile strain of 2% is applied to the cross-ply laminate in the 0° direction, the total area of opened incisions relative to the area of the cross-ply laminate (referred to as the area ratio of the opened incisions) is greater than or equal to 0% and less than or equal to 1%. An opened incision is, in some cases, filled with flowing resin or, in some other cases, reveals an adjacent layer when not filled with resin. In either cases, the open incision looks different in color from sites in which reinforcing fibers are contained, surface quality is often impaired when the cross-ply laminate is formed as a fiber reinforced plastic.

In the present invention, the opened incision refers to an opening portion whose incision and a site other than the incision can be separated when a digital image photographed in a surface of the cross-ply laminate or the fiber reinforced plastic, from a distance greater than or equal to 10 cm and less than or equal to 50 cm from the surface, is binarized by an image process.

In the case where the area ratio of the opened incisions in the cross-ply laminate is greater than or equal to 0% and less than or equal to 1%, opened incisions are not easily recognized by visual inspection, and the surface quality of the fiber reinforced plastic after solidification is good.

As for the case where the area ratio of opened incisions is greater than or equal to 0% and less than or equal to 1% even in the case where a tensile strain of 2% be given, there can be cited a case where individual incision openings are small, cases where the probability of presence of incisions are low, such as the case where the fiber length is long, etc. Inflow of reinforcing fiber bundles adjacent to an incision can make possible an opening of 1% or less. A further preferable area ratio of opened incisions is 0.8% or less.

The cross-ply laminate of the present invention, even when the foregoing tensile property is not satisfied at room temperature (in a 25° C. environment), may be a cross-ply laminate wherein, in the case where the fiber direction of one of the incised prepregs in the cross-ply laminate at a temperature of 60° C. is 0°, load 1×0.5<load 2<load 1×1.5 (tensile property) is satisfied where the load 1 is a load that occurs in the cross-ply laminate in a 0° direction when a tensile strain of 1% is applied to the cross-ply laminate in the 0° direction and the load 2 is a load that occurs in the cross-ply laminate in the 0° direction when, in a 60° C. environment, a tensile strain of 2% is applied to the cross-ply laminate in the 0° direction. Even when forming of the cross-ply laminate at room temperature is difficult, forming can be easily done and, after the forming, the shape is easily fixed if, in a 60° C. environment, load 1×0.5<load 2<load 1×1.5 is satisfied when the cross-ply laminate is formed while being heated by heating means, such as a dryer. It is preferable that load 1×0.7<load 2<load 1×1.3.

Furthermore, even at a temperature of 60° C., it is preferable that, from the viewpoint of the surface quality of the fiber reinforced plastic, that in the case where the fiber direction of one of the incised prepregs of the cross-ply laminate is 0°, the total area of opened incisions relative to the area of the cross-ply laminate (the area ratio of the opened incisions) be greater than or equal to 0% and less than or equal to 1% when a tensile strain of 2% is applied to the cross-ply laminate in the 0° direction. A further preferable area ratio of opened incisions is 0.8% or less.

Incidentally, the area ratio of opened incisions in the cross-ply laminate when a tensile load is given can be measured by photographing the cross-ply laminate during a tensile test and then carrying out image processing by a method described in Examples. Incidentally, in the case where, during a process of applying a tensile strain of 2% in the 0° direction of the cross-ply laminate, a sharp load fall occurs so that load 2<load 1×0.5, undulation of reinforcing fibers occurs so that the surface quality is impaired.

As a preferred mode of the cross-ply laminate in the present invention, it is preferable that the area thereof be 0.5 m$^2$ or greater. Further preferably, the area is 0.8 m$^2$ or greater. On the other hand, a practical maximum value of the area of the cross-ply laminate is 5 m$^2$. Usually, as prepregs or incised prepregs not laminated are larger in area, they more easily sag and more easily wrinkle when disposed in a mold at the time of molding. When prepregs or incised prepregs are formed into a cross-ply laminate, stiffness improves so that even when the area is 0.5 m$^2$ or greater, the cross-ply laminate does not easily wrinkle when disposed in a mold. Furthermore, to manufacture a cross-ply laminate having a large area, a plurality of incised prepregs are joined to form a layer in some cases. Formed as a cross-ply laminate, junctures in one layer are supported by the other layer and therefore do not come loose, so that handleability improves. It is preferable that the junctures be linear parallel with the reinforcing fibers, in order to maintain mechanical properties of a fiber reinforced plastic obtained by solidifying the cross-ply laminate.

In the case where the resin is a thermoplastic resin, the incised prepregs do not have tackiness and therefore cannot be laminated and integrated at normal temperature; hence, it is advisable that the incised prepregs be integrated by a method with heating and pressurizing means, such as press molding, to manufacture a cross-ply laminate.

The cross-ply laminate of the present invention may be set in a mold die while remaining in a tabular shape or may also be formed as a preform by pressing the cross-ply laminate against a mold, and then may be subsequently produced as a fiber reinforced plastic by solidifying the preform. Since the cross-ply laminate of the present invention can be stretched in the orientation direction of the reinforcing fibers as well, the preform does not need to completely conform to the mold when molding under high pressure, such as press molding by a double-sided mold. Laying the cross-ply laminate highly accurately along protuberances and depressions requires a long time. However, the cross-ply laminate can be conformed in shape to a mold by pressure, without a need to perfectly conforming it to the surface of the mold, so that the preform manufacturing time can be shortened. Not causing the cross-ply laminate to perfectly conform to the surface of the mold means that the area of the preform in contact with the mold is 90% or less of the surface area of the mold. The preform may be produced by pressing it against a mold by manual operation (hand lay-up) and may also be pressed against a mold by using a robot or the like. At the time of conforming the cross-ply laminate to fine protuberances and depressions, adoption of forming by manual operation makes it possible to limit sites of stretch and accurately conform it thereto while checking sites of occurrence of wrinkles, and therefore is preferable. Furthermore, a plurality of cross-ply laminates may be laminated by superimposing them with different angles. To solidify the preform, the preform may be disposed between a mold and a bag film with a tightly closed spaced formed, and the tightly closed space may be vacuumed to pressurize the incised prepreg laminate by the differential pressure with respect to the atmospheric pressure and simultaneously the incised prepreg laminate may be heated, and may be formed further by compressed heated gas by autoclave. Alternatively, employing an oven or contact heating and using a vacuum pump, the preform may be solidified and molded only by pressurization by the differential pressure with respect to the atmospheric pressure. Alternatively, the preform may be sandwiched between molds and may be solidified by press molding.

When the cross-ply laminate is pressed against a mold, it is also preferable that a step of heating the cross-ply laminate be included. That is, when the cross-ply laminate is pressed against the mold, a step of softening the cross-ply laminate by heating means such as a dryer or a heater may be included. The step may be a step in which the mold itself be heated. The heating of the cross-ply laminate, in some cases, softens the incised prepreg and increases the shape conformity. It is appropriate that the temperature for heating be of a level such that the cross-ply laminate does not lose its shape and be a temperature such that the resin viscosity remains 50 Pa·s or higher.

The present inventors have also found, as a method for producing an incised prepreg, that an incised prepreg that delivers excellent formability and, at the time of solidification, high mechanical properties can be produced by, while tension is given to a prepreg that contains reinforcing fibers and a resin, passing it through between a rotary blade roll whose total length of blades is within the range of 1 to 3000 m/m² and a supporting roll proximate to and substantially parallel with the rotary blade roll in such a manner as to have end sides of the prepreg within a predetermined range in the axis direction of the rotary blade roll so that the slack of the prepreg and positional deviation of the prepreg in the width direction are reduced and so that the prepreg, without being wrinkled, is continuously and stably provided with incisions that divide at least one of the reinforcing fibers into fiber lengths within the range of 10 to 300 mm.

FIG. 8 and FIG. 9 illustrate a production method for an incised prepreg in the present invention. From a prepreg roll 15 obtained by continuous rolling a prepreg in its lengthwise direction on a paper tube or the like, a prepreg 1 is unwound, and then the prepreg 1 is passed through between a rotary blade roll 17 with a plurality of blades 16 arranged and a supporting roll 18, so that, at the sites where the blades 16 are pressed to the prepreg 1, reinforcing fibers are cut. Thus, an incised prepreg 14 is obtained.

The supporting roll 18 is proximate to and substantially parallel with the rotary blade roll 17. Between the two rolls there is provided a clearance through which the blade 16 can pass. Being substantially parallel means that, at a given location in the width direction of the rotary blade roll 17 of the supporting roll 18, the clearance between the supporting roll 18 and the rotary blade roll 17, excluding the blades, is within the range of ±10% from the mean value in the width direction of the rotary blade roll 17 or the supporting roll 18.

The rotary blade roll 17 may be one whose blades 16 have been machined from the roll or may also be a roll obtained by wrapping a sheet provided with the blades 16 on a roll through the use of magnets or adhesion means such as adhesive. In particular, a method in which the roll is a magnet roll and a metal sheet provided with blades is pasted allows easy detachment and attachment of a metal sheet at the time of replacement of blades and makes it possible to produce a plurality of incision patterns through the use of the same rotary blade roll by replacing metal sheets that cost less than the machining of rolls themselves, and is therefore preferable.

Prepregs may be placed in the form of cut sheets onto the rotary blade roll. However, supplying a prepreg continuously is more excellent in productivity and, in particular, unwinding a prepreg from a prepreg roll put on a hanger and placing it is appropriate. Likewise, after leaving the rotary blade roll, the prepreg may be cut into a cut sheet, and may also be wound up in the form of a roll by using a winder.

The production method for an incised prepreg in the present invention is applied mainly to unidirectional prepregs in which reinforcing fibers are unidirectionally oriented, but may also be applied to a woven fabric prepreg that has a weave structure. Furthermore, the method can be also suitably used when a prepreg laminate sheet obtained by laminating a plurality of unidirectional prepregs or woven fabric prepregs is provided with incisions. The prepreg laminate sheet may be, for example, one in which a plurality of prepregs are laminated at different angles, for example, a cross-ply laminate sheet in which a plurality of unidirectional prepregs are laminated so that the reinforcing fibers are in orthogonal directions, and may also be a laminate sheet in which prepregs different in the reinforcing configuration, such as unidirectional prepregs, woven fabric prepregs, etc., are mixed.

The use of a rotary blade roll having blades disposed at predetermined positions makes it possible to insert the blades into the prepreg cyclically in coordination with the feeding of the prepreg, and increasing the rotation speed of the rotary blade roll will improve the speed of production of incised prepregs.

As for the density of the incisions 2 provided in the incised prepreg 14 in a surface of the incised prepreg, the higher the density, the more improved the moldability of the incised prepreg 14; however, when the density is excessively high, the mechanical property at the time of solidification becomes low. Here, the density of the incisions 2 provided in the incised prepreg 14 in the surface of the incised prepreg can be expressed by using as an index the total of lengths of blades in a unit area. Provided that this indicator is 1 m/m² or greater, increases in the density of the incisions 2 progressively improve the moldability of the incised prepreg 14. In the case where the indicator exceeds 3000 m/m², the density is excessively high and the mechanical properties at the time of solidification decrease. Furthermore, in the case where the total of lengths of blades per area is long, points of contact between the prepreg and blades that are pressed at the time of cutting increase and, therefore, the resistance given to the prepreg increase, so that the meandering of the prepreg and the effect of drawing the prepreg into the rotary blade roll occur in some cases. Therefore, it is preferable that the total of lengths of blades provided on the rotary blade roll be within the range of 1 to 3000 m/m$^2$. A particularly preferable total of lengths of blades provided on the rotary blade roll is within the range of 30 to 1000 m/m$^2$.

Even though the total of lengths of the incisions is within the range mentioned above, the case where the a reinforcing fiber having a length less than 10 mm is locally present causes decreases in the mechanical properties at the time of solidification of the incised prepreg, and the case where the fiber length of reinforcing fibers exceeds 300 mm gives rise to possibility that the reinforcing fibers may brace at the time of molding a complicated shape and may result in a molding defect; therefore, it is advisable that the fiber length of the reinforcing fiber be 300 mm or less. Therefore, it is preferable that the length of reinforcing fibers divided by the blades be within the range of 10 to 300 mm. That is, in the present invention, it is preferable that an incised prepreg be provided by dividing reinforcing fibers so that at least some of the reinforcing fibers have a fiber length of 10 to 300 mm. A particularly preferable length of reinforcing fibers is within the range of 15 to 200 mm.

Furthermore, all the reinforcing fibers in the prepreg may be cut by the blades or some of the reinforcing fibers may be left uncut.

In FIG. 8 and FIG. 9, the prepreg 1 and the incised prepreg 14 are moved in a feeding direction 22 of the incised prepreg by rotation 19 of the rotary blade roll 17. At this time, the supporting roll 18 may also be rotating, and a mechanism in which rotation of the rotary blade roll is caused by rotation of the supporting roll may also be employed. The rotation of the rotary blade roll 17 and the rotation of the prepreg roll 15 do not necessarily need to be coordinated. However, the present invention has a feature that while tension is being given to a prepreg, the prepreg is passed through between a rotary blade roll and a supporting roll so as to provide an incised prepreg. Therefore, it is preferable that torque of rotation or rotation speed of the prepreg roll 15 be controlled so as to given a tension 23 to the prepreg 1. If the prepreg 1 is in a slack state and is passed through, while the slack is being dragged in, between the rotary blade roll 17 and the supporting roll 18, the incised prepreg 14 wrinkles, thus making it difficult to stably produce a good-quality incised prepreg 14.

It is preferable that the tension 23 given to the prepreg be kept substantially constant during a continuous operation in which the prepreg 1 is continuously passed through between the rotary blade roll 17 and the supporting roll 18. If the tension 23 becomes small during the continuous operation, there are cases where the prepreg 1 sags and the incised prepreg 14 wrinkles. Substantially constant tension means that the tension is kept at an average tension ±10%. A preferable range of the tension is 10 to 20 kg/m.

Furthermore, even in the case the prepreg 1 is given tension, if the prepreg 1, when unwound from the prepreg roll 15, deviates in the axis direction 17a of the rotary blade roll (a depth direction in FIG. 8 and a left-right direction in FIG. 9), end sides at the winding-up side deviate, so that rewinding is needed in order to align the end sides when the prepreg 1 is wound up into a roll and, furthermore, the deviation from the sheet path at the winding side produces strain so that the end sides of the prepreg 1 slacken, giving rise to a cause of wrinkling. Once the incised prepreg wrinkles, wrinkling propagates in a step in which the prepreg is continuously formed into an incised prepreg, and removal of wrinkles is difficult. Therefore, there is a need to stop the step and cut and dispose of the prepreg, so that the yield drops. Therefore, it is preferable that while the prepreg 1 is unwound from the prepreg roll 15 and is provided with incisions 2, a control be performed such that the end sides of the prepreg 1 remain within a predetermined range in the axis direction 17a of the rotary blade roll.

As for a concrete method for passing the prepreg through the rotary blade roll 17 and the supporting roll 18 so that the end sides of the prepreg is within a predetermined range in the axis direction 17a of the rotary blade roll as described above, it is preferable that, for example, using a sensor that detects the positions of the end sides of the prepreg 1, the positions of the end portions in the width direction of the prepreg roll 15 be adjusted so that the end sides thereof always pass within the predetermined range in the axis direction of the rotary blade roll. Incidentally, the predetermined range means that end sides of the prepreg 1 are within the range of an average position ±2.0 mm in the axis direction 17a of the rotary blade roll. It is more preferable that the end sides of the prepreg 1 be within the range of the average position ±1.0 mm in the axis direction 17a of the rotary blade roll, and it is further preferable that the end sides thereof be within the range of the average position ±0.5 mm.

As a preferable production method for the incised prepreg, a method in which, as illustrated in FIG. 10, after the prepreg 1 is passed through between the rotary blade roll 17 and the supporting roll 18 to provide an incised prepreg 14, the incised prepreg is extracted by pressing the incised prepreg 14 against the supporting roll 18 so that the rotary blade roll 17-side surface thereof separates from the rotary blade roll 17 can be cited. The method for pressing the incised prepreg 14 against the supporting roll 18 may use a presser roll 24 as in FIG. 10 or may also be a method in which, using a supporting roll that includes a suction mechanism, the incised prepreg 14 is suctioned to the roll surface of the supporting roll. At the time of passing the prepreg 1 through the rotary blade roll 17 and the supporting roll 18, the case where the resin contained in the prepreg has high viscosity or the case where the coefficient of friction between the blades 16 and the incisions 2 is high sometimes results in a case where the incised prepreg 14 is closely stuck to the rotary blade roll 17. In such a case, there is a need to peel the incised prepreg 14 off from the rotary blade roll 17. However, there are cases where reinforcing fibers divided by the blades 16 become fuzz, which remains on the surface of the incised prepreg and deteriorates the quality of the incised prepreg 14. By pressing the incised prepreg 14 to the supporting roll 18 side at the instant when blades 16 are pressed to the prepreg 1, the incised prepreg 14 can be inhibited from closely sticking to the rotary blade roll 17. This method can be preferably used particularly for a prepreg that uses a thermosetting resin. In the case of a prepreg that uses a thermosetting resin, since the prepreg usually has tackiness, the prepreg is supported on a sheet substrate A described below (e.g., a mold release paper). If the sheet substrate A peels off when the prepreg 1 is passed through between the rotary blade roll 17 and the supporting roll 18, the obtained incised prepreg 14 wrinkles when wound up. By extracting the incised prepreg 14 by pressing it against the supporting roll 18 so that the incised prepreg 14 separates from the rotary blade roll 17, the peeling of the sheet substrate A is inhibited so as to reduce the wrinkling at the time of winding up.

As a further preferable production method for an incised prepreg, a production method for an incised prepreg in which, as illustrated in FIG. 11, the prepreg 1 is passed through between the rotary blade roll 17 and the supporting roll 18 while being pressed against the supporting roll 18 so as to obtain an incised prepreg 14 can be cited. The pressing method may use a presser roll 25 as in FIG. 11 or may also be a method in which, using a supporting roll that includes a suction mechanism, the incised prepreg 14 is suctioned to the roll surface of the supporting roll. After the blades 16 are put into the prepreg, pressing the incised prepreg 14 to the supporting roll 18 side can inhibit the incised prepreg 14 from closely sticking to the rotary blade roll 17. However, having the prepreg 1 pressed against the supporting roll 17 prior to providing incisions can more certainly press the incised prepreg 14 against the supporting roll 18, so that the effect of inhibiting the incised prepreg 14 from closely sticking to the rotary blade roll 17 can be enhanced. Furthermore, pressing the prepreg 1 against the supporting roll 17 facilitates determining whether prepreg 1 has been fed perpendicularly to the rotary blade roll 17 and the supporting roll 18. For example, even a slight deviation of the feeding angle of the prepreg 1 from the perpendicular angle gives rise to a phenomenon in which one side of the prepreg 1 lifts when the prepreg 1 is pressed against the supporting roll 17.

As a further preferable production method for an incised prepreg, a production method of an incised prepreg in which a sheet substrate A has been disposed on a supporting roll contact-side surface of the prepreg, and the blades provided on the rotary blade roll are pressed to the prepreg so that the blades penetrate the prepreg and so that the incisions extend to a range of 5 to 75% in the sheet substrate A in its thickness direction from the prepreg contact-side surface of the sheet substrate A can be cited.

Here, as the sheet substrate A, papers, such as Kraft paper, woodfree paper, glassine paper, and clay-coated paper, polymer films, such as polyethylene and polypropylene, metal foils, such aluminum, etc. can be cited. Furthermore, in order to give or improve mold releasability with respect to the resin, a silicone based or "Teflon (registered trademark)" based mold release agent, metal vapor deposition, or the like may be applied to the surface of the sheet substrate A. The sheet substrate A may adhere to the prepreg to support the prepreg and may also be one that does not support the prepreg. Inserting the blade even into the sheet substrate A can certainly provide the prepreg with incisions that penetrate the prepreg. If the prepreg is provided with penetrating incisions in the case where the sheet substrate A is not used, there are cases where blades contact the supporting roll. In such cases, there is concern that degradation of the blades may accelerate. As for the amount of intrusion of the distal ends of the blades into the sheet substrate A, in order to ensure that even when the blades are worn due to repeated cutting, insufficient cut will not occur, it is preferable that the blades be inserted to 5% or greater into the sheet substrate A in its thickness direction from its prepreg contact-side surface. Furthermore, in order for the blade not to contact the supporting roll even when there is nonuniformity in the clearance between the rotary blade roll and the supporting roll, it is preferable that the blades be inserted to 75% or less into the sheet substrate A in its thickness direction from its prepreg contact-side surface. Therefore, it is preferable that the amount of insertion of the blades into the sheet substrate A be 5 to 75% into the sheet substrate A in its thickness direction from its prepreg contact-side surface. A further preferable amount of insertion of the blades into the sheet substrate A in its thickness direction is 10 to 50%.

A further preferable production method for an incised prepreg, a production method for an incised prepreg in which after a prepreg is passed through between the rotary blade roll and the supporting roll, the incised prepreg and a sheet substrate A are thermal pressure bonded can be cited. In cases where the adhesion between the sheet substrate A and the prepreg is weak, there are cases where the sheet substrate A peels off although the prepreg is inserted between the rotary blade roll and the supporting roll while being pressed against the supporting roll. In cases where the sheet substrate A disposed on the surface of the incised prepreg has peeled off from the incised prepreg before the incised prepreg is extracted, there is possibility that the sheet substrate A cannot support the incised prepreg and therefore the incised prepreg may wrinkle. By thermal pressure bonding the prepreg, the incised prepreg and the sheet substrate A can be adhered. With regard to a concrete temperature, there is no particular restriction. The temperature depends on the kind of the resin, the feed speed of the prepreg, etc. There is no need to give a temperature at which the viscosity of the resin extremely falls. As for the prepreg that uses a thermosetting resin, there are cases where the effect of adhesion can be obtained even at a low temperature of 50° C. or less. With regard to pressure, there is also no particular restriction. However, there is no need to apply a high pressure such that the incised prepreg is crushed. There are cases where even a low pressure of about 3 to 5 kg/cm$^2$ achieves advantageous effects.

As a further preferable production method for an incised prepreg, a production method for an incised prepreg in which when a prepreg is passed through between the rotary blade roll and the supporting roll, a sheet substrate B has been disposed between the prepreg and the rotary blade roll and the prepreg is provided with incisions that penetrate the sheet substrate B can be cited. In cases where the resin contained in the prepreg is a thermosetting resin and has strong tackiness, provision of a sheet substrate B between the blades and the prepreg at the time of forming incisions makes it possible to inhibit the prepreg from adhering to the blades and makes it possible to inhibit adhesion of the prepreg sheet to itself when the incised prepreg sheet is wound up. The sheet substrate B may be a cover film, such as a polyethylene film or a vinyl chloride film, that protects the surface of the prepreg. Furthermore, cases where the sheet substrate B is a material, such as sponge or the like, that has stretchability have an advantageous effect of pressing the prepreg to the supporting roll side when the prepreg is passed through between the rotary blade roll and the supporting roll and also have an advantageous effect of inhibiting the incised prepreg from adhering to the rotary blade roll. Cases where the sheet substrate A is present between the prepreg and the supporting roll have an advantageous effect of inhibiting the sheet substrate A from peeling off from the prepreg by using a method in which the sheet substrate B is disposed between the prepreg and the rotary blade roll and the prepreg is provided with incisions that penetrate the sheet substrate B.

As a further preferable production method for an incised prepreg, a production method for an incised prepreg in which a prepreg is inserted and passed through between the rotary blade roll and the supporting roll while the rotary blade roll is being cooled can be cited. Cases where the rotary blade roll is cooled have an advantageous effect of cooling the incised prepreg and therefore inhibiting the incised prepreg from adhering to the rotary blade roll, particularly in cases where the prepreg contains a thermosetting resin, whose viscosity becomes high.

As a pattern of the blades provided on a preferable rotary blade roll, it is preferable that, in a circular shape formed by projecting all the blades provided on the rotary blade roll to a plane perpendicular to the axis direction of the rotary blade roll, the circular shape include no discontinuous portion or the circular shape have a discontinuous portion and, as for each discontinuous portion, the central angle formed by the two ends of the discontinuous portion and the center of the circular shape be 5° or less. Here, the discontinuous portion refers to, as illustrated in FIG. 12, a region 27 without a blade in a circular shape 26 formed when all the blades 16 on the rotary blade roll 17 are projected to a plane perpendicular to the axis direction of the rotary blade roll and the central angle formed by the two ends of the discontinuous portion and the center of the circular shape is indicated by numerals 28. In cases where such a discontinuous portion 27 is present as in FIG. 12(a), there occur instants at which no blade is pressed to the prepreg while the prepreg is being inserted between the rotary blade roll and the supporting roll. While blades are pressed to the prepreg, reaction force occurs in such a direction that the clearance between the rotary blade roll and the supporting roll expands. However, when an instant at which no blade is pressed to the prepreg occurs, the reaction force occurring on the rotary blade roll and the supporting roll is released. Thus, the presence and absence of reaction force repeatedly occur, so that the load on the rotary blade roll and the supporting roll becomes large. It is further preferable that the circular shape include no discontinuous portion or the circular shape include a discontinuous portion and, as for each discontinuous portion, the central angle formed by the two ends of the discontinuous portion and the center of the circular shape be 2° or less in any given discontinuous portion. Particularly preferably, it is preferable that, as in FIG. 12 (b), the circular shape include no discontinuous portion. Furthermore, in cases where the absolute value of the angle θ formed by a blade and the circumferential direction of the rotary blade roll is smaller than 45°, the instants at which the prepreg is not pressed against any blade of the rotary blade roll can be reduced.

In cases where the rotary blade roll is provided with only blades whose θ is positive (or only blades whose θ is negative), there are cases where when a prepreg is passed through between the rotary blade roll and the supporting roll, the prepreg moves in a direction of θ and the incised prepreg gradually deviates in the axis direction of the rotary blade roll. If the incised prepreg deviates in the axis direction of the rotary blade roll, it sometimes happens that when the prepreg is passed through between the rotary blade roll and the supporting roll, the prepreg sags and, after provision of incisions, wrinkles, and it is sometimes difficult to stably produce an incised prepreg. If the blades whose θ is positive and the blades whose θ is negative are substantially equal in number, the deviation of the prepreg in its width direction at the time of providing incisions can be reduced. Incidentally, in the present invention, that the number of blades whose θ is positive and the number of blades whose θ is negative are substantially equal numbers means that, when expressed in percentage based on number, the number of blades whose θ is positive and the number of blades whose θ is negative are each greater than or equal to 45% and less than or equal to 55%. Such a highly accurate control of the incision position becomes possible by adjusting, while the prepreg is given tension, the positions of the end sides of the prepreg in the axis direction of the rotary blade roll and pressing the prepreg against the rotary blade roll provided with blades with high positional accuracy.

In the foregoing description, the shape blades provided on the rotary blade roll is a shape thereof when the rotary blade roll has been developed in a planar fashion. Furthermore, each blade may be of a straight line shape or a curved line shape. In cases where each blade has a curved line shape, θ refers to the angle formed between a line segment connecting an end portion of a blade to another end portion and the circumferential direction of the rotary blade roll.

Examples

Hereinafter, the present invention will be further concretely described with reference to examples. However, the present invention is not limited to the inventions described in the examples. In these examples, the manufacture of incised prepregs, the density distribution of incisions, the conformity to three-dimensional shapes, the quality of the surface of fiber reinforced plastics, the tensile elastic modulus, and the tensile strength were measured according to the following methods. FIGS. 15 to 17 illustrate some of incision patterns used in the examples and comparative examples, in which the incision patterns, on the incised prepreg, are repeated in the prepreg surfaces. Results of Examples 1 to 7 and Comparative Examples 1 to 5 were as indicated in Table 1, and results of Examples 8 to 11 and Comparative Examples 6 to 7 were as indicated in Table 2.

<Production of Incised Prepregs>

A "TORAYCA" (trademark registration) prepreg sheet P3052S-15 (reinforcing fiber: T700S, resin composition resin: 2500, and volume fraction of reinforcing fiber: 56%, and a mold release paper is laminated on a side surface) was prepared. With regard to Examples 1 to 11, incisions penetrating the prepregs were provided by a method of Example 17 described below. The incised region was the entire prepreg. Each prepreg sheet was supported by a mold release paper that was a sheet substrate A. A polyethylene film was closely stuck to the opposite side surface of the prepreg to the mold release paper. When incisions were provided, the incisions that penetrated the polyethylene film and that extended to about 50% of the thickness of the mold release paper were provided.

<Measurement of Distribution of Incisions>

An incised prepreg of 50 mm×50 mm was cut out, and the mold release paper was peeled off, and the incisions transferred to the mold release paper were counted. The incisions provided in the mold release paper were provided continuously from the incisions of the incised prepreg. The size and density of the incisions of the mold release paper could be considered substantially equal to those of the incisions of the incised prepreg. On the mold release paper, ten small regions were extracted by drawing them by a pen. The total numbers of incisions encompassed in the individual small regions and incisions in contact with the boundaries of the small regions were calculated and determined as a population. Using expression 1 and expression 2, a mean value for the population and a coefficient of variation therefor were calculated. Incidentally, the small regions were extracted as in FIG. 18 so that the small regions formed a hexagonal close packed arrangement.

<Checking of Surface Quality after Press Molding>

A laminate of 150 mm×150 mm laminated so as to have [+45/0/−45/90]$_{2s}$ where the orientation direction of the reinforcing fiber of the incised prepreg was 0° was prepared, and was subjected to press molding using a mold die having a shape illustrated in FIG. 13. The molding temperature was 150° C., and the press pressure was 3 MPa. The surface quality of each molded article was evaluated in three grades mentioned below.

A. The presence of incisions was hardly recognizable.

B. Incision opening was slight but the presence of incisions was recognized.

C. Incision openings had large openings and incision opening was conspicuous.

<Tensile Elastic Modulus and Tensile Strength of Fiber Reinforced Plastic>

A laminate of incised prepregs of 300 mm×300 mm having a laminate configuration of [+45/−45/0/90]$_{2s}$ was manufactured from incised prepregs. At the time of lamination, the incised prepregs were laminated so that the surface of each prepreg from which the polyethylene film was peeled off was on top. After that, the laminate of the incised prepregs was press molded under a surface pressure of 3 MPa by a pressing machine, using a mold of 350 mm×350 mm, to mold a fiber reinforced plastic of 350 mm×350 mm. The temperature at the time of pressing was 130° C. After pressing, the state was maintained for 90 minutes prior to the mold release. The fiber reinforced plastic was left standing at room temperature to cool. Test pieces of 25 mm×250 mm were cut out so that the 0-degree direction of the reinforcing fibers was in the lengthwise direction, and were subjected to a tensile test by a method stipulated in ASTM D3039 (2008). The numbers of test pieces measured were five for each level. Mean values of the tensile elastic modulus and the tensile strength were calculated as representative values.

<Measurement of Tensile Property of Cross-Ply Laminate and Measurement of Area Ratio of Opened Incisions>

Prepreg tensile test pieces of 50 mm×250 mm were cut out from the cross-ply laminate so that the fiber direction of one of the prepregs of the cross-ply laminate was the lengthwise direction (this fiber direction was determined as 0°). In a 25° C. environment, 50 mm-portions at two ends of each prepreg tensile test piece were gripped, with the span being 150 mm, to apply tensile load to the prepreg tensile test piece by using a tensile tester. The tensile strain was measured by tracing the distance between two points that had been marked 50 mm apart from each other at a center on the 0°-side surface of each prepreg tensile test piece, through the use of a non-contact strain gauge placed facing the 0° side of the prepreg tensile test piece. The load when the tensile strain in the 0° direction was 1% was recorded as load 1, and the load when the tensile strain in the 0° direction was 2% was recorded as load 2.

While tensile strain was being applied, the 0° side of the prepreg tensile test piece and a digital camera were placed facing each other across a space of 30 cm so that overlap with the non-contact strain gauge was avoided. Except for the side facing the digital camera, covering with a curtain for blocking light was provided. A lighting for illuminating the prepreg tensile test piece from the side facing the digital camera was installed. Thus, digital images of the prepreg tensile test piece when the tensile strain in the 0° direction was 2% were acquired. From the digital image, a digital image of 500×500 pixels that corresponded to a region of a central portion of 25 mm×25 mm of a test piece, and binarized so that the pixels corresponding to incisions were 1 and the sites other than the incisions were 0, and the proportion of the number of pixels corresponding to the incisions to the total number of pixels corresponding to the cut-out digital image was used to acquire an area ratio of the opened incisions.

<Conformity of Three-Dimensional Shapes>

A cross-ply laminate of incised prepregs laminated so as to have [0°/90°] where the orientation direction of reinforcing fibers of the incised prepregs was 0° was prepared, and then manually laid, at normal temperature (25° C.), along a mold whose lower mold had a shape as in FIG. 14. Forming was carried out by aligning sides of a bottom of the mold with the fiber direction of the cross-ply laminate, pressing the cross-ply laminate, and stretching wrinkles formed on a side surface at the time of stretching the cross-ply laminate in the 45° direction of the cross-ply laminate, so that the cross-ply laminate lay along the corner portion. The cross-ply laminate was laid also along the other three corner portions in substantially the same manner so that the cross-ply laminate was turned into a preform formed in a box shape agreeing with the mold. In Table 1, the labor needed for forming was used as an index of the conformity to three-dimensional shapes, and divided into the following three grades.

A: the cross-ply laminate was easily stretchable in any direction and was able to be formed into the box shape without wrinkling.

B: the cross-ply laminate partially had sites that did not easily stretch, but was able to be formed into the box shape without wrinkling.

C: the cross-ply laminate did not easily stretch and wrinkling remained when the cross-ply laminate was formed into the box shape.

<Surface Quality of Molded Fiber Reinforced Plastic (Molded Article)>

In order to check the quality of a surface that was not a transfer surface whose surface quality was influenced by the smoothness of the mold die, a fiber reinforced plastic was produced by heating a preform manufactured by pressing a cross-ply laminate to a mold as in FIG. 14 to 130° C. at 0.1° C./min so that the preform solidified, while the preform continued to be pressed against the mold.

In Table 1, the surface qualities of the obtained fiber reinforced plastics were divided into the following four grades.

A. The presence of incisions was hardly recognizable, and no wrinkling occurred.

B. Incision opening was slight but the presence of incisions was recognized, and no wrinkling occurred.

C. Openings of incisions existed but no wrinkling occurred.

D. Wrinkling occurred.

Example 1

The incision pattern of incised prepregs was an incision pattern as in FIG. 15(a). The length of divided reinforcing fibers was 8 mm, the projected length Ws of the incisions projected to a plane perpendicular to the orientation direction of reinforcing fibers was 1 mm, and the angle formed between the incisions and the orientation direction of reinforcing fibers was 90°. Reinforcing fiber bundles divided by incisions were shifted by ⅓ of the reinforcing fiber length L from the adjacent reinforcing fiber bundles.

As for press molded articles, openings of incisions were seen on the surfaces. The length of reinforcing fibers thereof was short but the tensile elastic modulus thereof was high in value.

Example 2

The incision pattern of incised prepregs was an incision pattern as in FIG. 15 (b). The length of divided reinforcing fibers was 12 mm, the projected length Ws of the incisions projected to a plane perpendicular to the orientation direction of reinforcing fibers was 0.64 mm, and the angle formed between the incisions and the orientation direction of reinforcing fibers was 40°. The incisions were substantially of the same length Y=1 mm, and the distance between most proximate incisions was 1.7 mm, which was longer than 0.5 time Y. Reinforcing fiber bundles divided by incisions were shifted by ⅙ of the reinforcing fiber length L from the adjacent reinforcing fiber bundles.

As for press molded articles, openings of incisions were seen on the surfaces. The tensile elastic modulus was substantially equal to that in Example 1 but the tensile strength improved over Example 1.

Example 3

The incision pattern of incised prepregs was an incision pattern as in FIG. 15 (c). A given incision and another incision that was the most proximate to that incision did not divide the same reinforcing fiber. The incisions were substantially of the same length Y=1 mm, and the distance between most proximate incisions was 1 mm, which was substantially equal to Y. The length of divided reinforcing fibers was 20 mm, the projected length Ws of the incisions projected to a plane perpendicular to the orientation direction of reinforcing fibers was 0.34 mm, and the angle formed between the incisions and the orientation direction of reinforcing fibers was 20°. A plurality of incisions formed dashed straight lines.

The surface quality of press molded articles was substantially equal to that in Examples 1 and 2, but the tensile elastic modulus and the tensile strength thereof were even higher in value than in Examples 1 and 2.

Example 4

The incision pattern of incised prepregs was an incision pattern as in FIG. 15(d). A given incision and another incision that was the most proximate to that incision did not divide the same reinforcing fiber. The incisions were substantially of the same length Y=1 mm, and the distance between most proximate incisions was 1.5 mm, which was 1.5 times Y. The length of divided reinforcing fibers was 20 mm, and the projected length Ws of the incisions projected to a plane perpendicular to the orientation direction of reinforcing fibers was 0.34 mm. The angle formed between the incisions and the orientation direction of reinforcing fibers was 20°. Reinforcing fiber bundles divided by incisions were shifted by ⅖ of the reinforcing fiber length L from the adjacent reinforcing fiber bundles.

The surface quality of press molded articles was substantially equal to that in Example 3, but the tensile elastic modulus thereof was even higher in value than that in Example 3.

Example 5

The incision pattern of incised prepregs was an incision pattern as in FIG. 15(e). The incisions were substantially of the same length Y=1 mm, and the distance between most proximate incisions was 1.4 mm, which was 1.4 times Y. The length of divided reinforcing fibers was 12 mm, and the projected length Ws of the incisions projected to a plane perpendicular to the orientation direction of reinforcing fibers was 0.64 mm. The absolute value of the angle θ formed between the incisions and the orientation direction of reinforcing fibers was 40°, and substantially equal numbers of positive incisions whose θ was positive and negative incisions whose θ was negative were included.

At the time of production of an incised prepreg by a rotary blade roll, the deviation of the prepreg in the width direction was smaller than that in the incision pattern of Example 2. Since positive incisions and negative incisions were present no matter which one of the mold release paper side and the polyethylene film was on top, the incised prepregs could be laminated without a need to mind the obverse or reverse side thereof. Furthermore, the polyethylene film could be peeled without tearing it whereas, in the case of the incision pattern of Example 2, the polyethylene film easily tore when the polyethylene film was peeled.

As for the press molded articles, incision openings were seen but were less visible than in Example 2. The tensile elastic modulus and the tensile strength were substantially equal in value to those in Example 2.

Example 6

The incision pattern of incised prepregs was an incision pattern as in FIG. 15 (f). A given incision and another incision that was the most proximate to that incision did not divide the same reinforcing fiber. The incisions were substantially of the same length Y=1 mm, and the distance between most proximate incisions was 1.5 mm, which was 1.5 times Y. The length of divided reinforcing fibers was 20 mm, and the projected length Ws of the incisions projected to a plane perpendicular to the orientation direction of reinforcing fibers was 0.34 mm. The absolute value of the angle θ formed between the incisions and the orientation direction of reinforcing fibers was 20°, and substantially equal numbers of positive incisions whose θ was positive and negative incisions whose θ was negative were included. Furthermore, the intervals between incisions present on an extended line of incisions were different for the positive incisions (3.4 mm) and the negative incisions (24.5 mm).

As for press molded articles, substantially no incision openings were seen. The tensile elastic modulus and the tensile strength were higher in value than in Examples 3 and 4.

Example 7

The incision pattern of incised prepregs was an incision pattern as in FIG. 15 (f). A given incision and another incision that was the most proximate to that incision did not divide the same reinforcing fiber. The incisions were substantially of the same length Y=1 mm, and the distance between most proximate incisions was 1.8 mm, which was 1.8 times Y. The length of divided reinforcing fibers was 24 mm, and the projected length Ws of the incisions projected to a plane perpendicular to the orientation direction of reinforcing fibers was 0.34 mm. The absolute value of the angle θ formed between the incisions and the orientation direction of reinforcing fibers was 20°, and substantially equal numbers of positive incisions whose θ was positive and negative incisions whose θ was negative were included. Furthermore, the intervals between incisions present on an extended line of incisions were different for the positive incisions (33.3 mm) and the negative incisions (44.7 mm).

As for press molded articles, substantially no incision openings were seen. The tensile strength was higher in value than that in Example 6.

Comparative Example 1

The incision pattern of incised prepregs was an incision pattern as in FIG. 16 (a). There was possibility that an incision and another incision that was the most proximate to that incision might divide the same reinforcing fiber, and there were sites where the distance between most proximate incisions was shorter than 0.5 time the length of the incisions. The length of divided reinforcing fibers was 20 mm or less, the projected length Ws of the incisions projected to a plane perpendicular to the orientation direction of reinforcing fibers was 1 to 2 mm, and the incisions were randomly provided, with the angle θ between the incisions and the orientation direction of reinforcing fibers being in the range of 90°.

As for press molded articles, there were sites where incisions had large opening. The tensile strength was lower in any one of Examples 1 to 7.

Comparative Example 2

The incision pattern of incised prepregs was an incision pattern as in FIG. 16 (b). There was possibility that an incision and another incision that was the most proximate to that incision might divide the same reinforcing fiber. The length of divided reinforcing fibers was 20 mm, and the projected length Ws of the incisions projected to a plane perpendicular to the orientation direction of reinforcing fibers was 5 mm. The angle θ formed between the incisions and the orientation direction of reinforcing fibers was 40°.

As for the surfaces of press molded articles, incisions had large opening. The tensile elastic modulus and the tensile strength were higher than in Comparative Example 1 but lower than in Examples 3, 4, and 6, which had the same length of reinforcing fibers as this.

Comparative Example 3

The incision pattern of incised prepregs was an incision pattern as in FIG. 16 (c). There was possibility that an incision and another incision that was the most proximate to that incision might divide the same reinforcing fiber. The length of divided reinforcing fibers was 20 mm, and the projected length Ws of the incisions projected to a plane perpendicular to the orientation direction of reinforcing fibers was 5 mm. The absolute value of the angle θ formed between the incisions and the orientation direction of reinforcing fibers was 40°, and substantially equal numbers of positive incisions whose θ was positive and negative incisions whose θ was negative were included.

As for the surfaces of press molded articles, openings of incisions were seen but were smaller than in Comparative Example 2. The tensile strength slightly improved over Comparative Example 2.

Comparative Example 4

The incision pattern of incised prepregs was an incision pattern as in FIG. 16 (d). Continuous incisions were provided. The length of divided reinforcing fibers was 20 mm, and the angle θ formed between the incisions and the orientation direction of reinforcing fibers was 20°.

As for the surfaces of press molded articles, the incisions had large openings. The tensile strength was higher than in Comparative Example 3.

Comparative Example 5

The incision pattern of incised prepregs was an incision pattern as in FIG. 16 (e). The incisions were of substantially the same length Y=1 mm, the length of divided reinforcing fibers was 24 mm, and the projected length Ws of the incisions projected to a plane perpendicular to the orientation direction of reinforcing fibers was 0.34 mm. The absolute value of the angle θ formed between the incisions and the orientation direction of reinforcing fibers was 20°. In cases where the small regions were changed in position, there was a pattern in which the coefficient of variation exceeded 80%.

Despite being the same in the fiber length divided by incisions and the absolute value of θ, this comparative example, compared with Example 7, had large openings of the incisions on the surfaces of press molded articles and was low in the tensile strength.

Example 8

The incision pattern of incised prepregs was as illustrated in FIG. 17(a). The cut fiber length L was 24 mm, the projected length Ws of the incisions projected to a plane perpendicular to the orientation direction of reinforcing fibers was 1 mm, and the angle θ formed between the incisions and the reinforcing fibers was 25°. Reinforcing fiber bundles divided by incisions were shifted by ¼ of the reinforcing fiber length L from the adjacent reinforcing fiber bundles.

As for the tensile property of the cross-ply laminate, load 1×0.5<load 2<load 1×1.5 was satisfied. When the tensile strain was 2%, the incisions had large openings. The shape conformity by hand lay-up was good, and forming was accomplished without wrinkling. As the surface quality of fiber reinforced plastics molded, openings of incisions were seen on the surfaces thereof.

Example 9

The incision pattern of incised prepregs was an incision pattern as illustrated in FIG. 17(b), and cross-ply laminates was manufactured. A given incision and another incision that was the most proximate to that incision did not divide the same reinforcing fiber. The incisions were substantially of the same length Y=1 mm, and the distance between most proximate incisions was 1.5 mm, which was 1.5 times Y. The length of divided reinforcing fibers was 20 mm, and the projected length Ws of the incisions projected to a plane perpendicular to the orientation direction of reinforcing fibers was 0.34 mm. The angle formed between the incisions and the orientation direction of reinforcing fibers was 20°. Reinforcing fiber bundles divided by incisions were shifted by ⅖ of the reinforcing fiber length L from the adjacent reinforcing fiber bundles. The distribution of the incisions was measured. The mean value for the population was 12.4, and the coefficient of variation therefor was 10.9%.

As for the tensile properties of the cross-ply laminate, load 1×0.5<load 2<load 1×1.5 was satisfied. When the tensile strain was 2%, openings of incisions were seen but the opening area was smaller than in Example 8. As for the shape conformity by hand lay-up, there were sites where the stretching was not easy; however, forming was accomplished without wrinkling. As the surface quality of fiber reinforced plastics molded, openings of incisions were seen in the surfaces thereof.

Example 10

The incision pattern of incised prepregs was an incision pattern illustrated in FIG. 17 (c), and a cross-ply laminate was manufactured. The incisions were substantially of the same length Y=1 mm, and the distance between most proximate incisions was 1.4 mm, which was 1.4 times Y. The length of divided reinforcing fibers was 12 mm, and the projected length Ws of the incisions projected to a plane perpendicular to the orientation direction of reinforcing fibers was 0.64 mm. The absolute value of the angle θ formed between the incisions and the orientation direction of reinforcing fibers was 40°, and substantially equal numbers of positive incisions whose θ was positive and negative incisions whose θ was negative were included. The distribution of the incisions was measured, and the mean value for the population was 10.9, and the coefficient of variation therefor was 10.4%.

As for the tensile property of the cross-ply laminate, load 1×0.5<load 2<load 1×1.5 was satisfied. When the tensile strain was 2%, incisions were slightly open. The shape conformity by hand lay-up was good, and forming was accomplished without wrinkling. As the surface quality of fiber reinforced plastics molded, openings of incisions were slightly seen in the surfaces thereof.

Example 11

The incision pattern of incised prepregs was an incision pattern illustrated in FIG. 17(d), and a cross-ply laminate was manufactured. A given incision and another incision that was the most proximate to that incision did not divide the same reinforcing fiber. The incisions were substantially of the same length Y=1 mm, and the distance between most proximate incisions was 1.5 mm, which was 1.5 times Y. The length of divided reinforcing fibers was 20 mm, and the projected length Ws of the incisions projected to a plane perpendicular to the orientation direction of reinforcing fibers was 0.34 mm. The absolute value of the angle θ formed between the incisions and the orientation direction of reinforcing fibers was 20°, and substantially equal numbers of positive incisions whose θ was positive and negative incisions whose θ was negative were included. Furthermore, the intervals between incisions present on an extended line of incisions were different for the positive incisions (3.4 mm) and the negative incisions (24.5 mm). The distribution of the incisions was measured, and the mean value for the population was 11.3, and the coefficient of variation therefor was 7.9%.

As for the tensile property of the cross-ply laminate, load 1×0.5<load 2<load 1×1.5 was satisfied. When the tensile strain was 2%, openings of incisions were hardly visible. The shape conformity by hand lay-up was good, and forming was accomplished without wrinkling. As for the surface quality of fiber reinforced plastics molded, substantially no openings of incisions were seen in the surface.

Example 12

Using the same incised prepregs as in Example 11, the laminate configuration of a cross-ply laminate was made to be [0/90/90/0]. As for the tensile property of the cross-ply laminate, the load 1 was 3340 N and the load 2 was 4320 N, thus satisfying load 1×0.5<load 2<load 1×1.5, but forming at room temperature was difficult. The cross-ply laminate was heated by using a dryer. The shape conformity thereof became good so that the cross-ply laminate was able to be laid along the surface of the mold without wrinkling. The tensile property of the cross-ply laminate was measured in a 60° C. environment. The load 1 was 52 N and the load 2 was 45 N.

Example 13

Using the same incised prepregs as in Example 11, a cross-ply laminate of 1000 m×1000 m was manufactured. The incised prepregs were originally 500 mm wide. Incised prepregs of 1000 mm×500 mm were cut out so that the orientation direction of reinforcing fibers was the lengthwise direction. Then, the cut-out incised prepregs were joined in pairs to form two sheets of incised prepregs of 1000 mm×1000 mm, which were then laminated so that the orientation directions of reinforcing fibers orthogonal to each other. Thus, a cross-ply laminate of 1000 mm×1000 mm was formed. After lamination, vacuuming was performed to strengthen the close sticking between layers laminated. Although each layer was configured by two incised prepregs, the layer was supported by the other layer, so that the handleability thereof was good.

Manufactured incised prepregs were formed to a mold having a shape as in FIG. 19(a), so that a preform was obtained. Although about 20 minutes was required, the prepregs were able to be formed into protuberances and depressions shapes as in FIG. 19(b). A preform was sandwiched by a double-sided mold and hardened at 130° C. for 90 minutes to obtain a fiber reinforced plastic. The obtained fiber reinforced plastic exhibited substantially no incision openings and had good surface quality.

Example 14

A preform was obtained in substantially the same manner as in Example 13, except that a cross-ply laminate was not completely laid along the surface of the mold but formed in such a manner that part of the cross-ply laminate was off the mold. The forming time was 5 minutes, which means that forming was quicker than in Example 13. The preform was sandwiched by a double-sided mold, cured at 130° C. for 90 minutes to obtain a fiber reinforced plastic. As for the obtained fiber reinforced plastic, sites thereon that had been off the mold during the state of the preform conformed to protuberances and depressions as well, and substantially no incision openings were visible, and good surface quality was obtained.

Comparative Example 6

A prepreg laminate in which two prepregs without any incision provided were laminated so that the fiber directions thereof were perpendicular was manufactured.

As for the tensile property of the prepreg laminate, before a tensile strain of 2% was reached, rupture occurred so that a sharp load drop occurred and load 1×0.5<load 2<load 1×1.5 was not satisfied. As for the shape conformity by hand lay-up, stretching in the fiber direction was not easy and wrinkles could not be eliminated.

Comparative Example 7

The incision pattern of incised prepregs was an incision pattern illustrated in FIG. 17(e), and a cross-ply laminate was manufactured. A plurality of incisions were provided in a direction orthogonal to the reinforcing fibers, and the projected length Ws of the incisions projected along a direction perpendicular to the reinforcing fibers was 1 mm, which was equal to the length Y of the incisions, and the reinforcing fibers were divided into reinforcing fibers whose fiber length L was 24 mm. The distribution of the incisions was measured. The mean value for the population was 3.7 and the coefficient of variation therefor was 38.3%.

As for the tensile property of the cross-ply laminate, before a tensile strain of 2% was reached, rupture occurred, so that a sharp load drop occurred and load 1×0.5<load 2<load 1×1.5 was not satisfied. Therefore, it was impossible to measure the incision opening area ratio. As for the shape conformity by hand lay-up, stretching in the fiber direction was not easy and wrinkles could not be eliminated. As for the surface quality of the molded fiber reinforced plastic, openings of incisions were seen in the surface.

Comparative Example 8

Using a woven fabric prepreg F6343B-05 (reinforcing fiber: T300B-3000, and resin: 2500) in which the reinforcing configuration of reinforcing fibers was a weave structure, the shape conformity by hand lay-up was measured. The shape conformity by hand lay-up was as good as in Examples 1, 3, 4, and 5, and forming into a box shape was accomplished without wrinkling.

Comparative Example 9

Using incised prepregs not laminated, instead of a cross-ply laminate, forming to a mold shown in FIG. 19 was performed. Since the width of the incised prepregs was 1000 mm×500 mm, an attempt to form two incised prepregs independently of each other was made. However, before being formed, the incised prepregs wrinkled. The wrinkles could not be eliminated, so that forming was given up.

Example 15

From a roll of 200 mm wide obtained by winding a prepreg T800S/PPS in which unidirectionally oriented "TORAYCA" (trademark registration) carbon fiber T800S was impregnated with a thermoplastic resin PPS, the prepreg was unwound while tension was given thereto as in FIG. 8, performing such a control that each end side of the prepreg passed within the range of ±0.5 mm in the axis direction of a rotary blade roll between the rotary blade roll and a supporting roll proximate to and substantially parallel with the rotary blade roll, with a mold release paper as a sheet substrate A being clamped between the prepreg and the supporting roll so that the blades did not contact the supporting roll, in order to produce an incised prepreg. The obtained incised prepreg was wound by a roll.

The blades of the rotary blade roll were in a pattern illustrated in FIG. 15(*c*). The blades were linear, the projected length Ws of the blades to the axis direction of the rotary blade roll was 1.5 mm, the angle θ formed between the blades and the circumferential direction of the rotary blade roll was 25°, and the length of reinforcing fibers divided by the blades was 30 mm. The circular shape formed by projecting all the blades on the rotary blade roll to a plane perpendicular to the axis direction of the rotary blade roll had discontinuous portions. In each discontinuous portion, the central angle formed by the two ends of the discontinuous portion and the center of the circular shape was 3° or less. The total of the lengths of the blades was 78 m/m$^2$. The rotation speed of the rotary blade roll was 45°/second. Between the rotary blade roll and the supporting roll there was a clearance such that the blades were inserted to 50% in the thickness direction of the mold release paper.

As a result, an incised prepreg whose surface exhibited slight fluffing of carbon fibers but which had no wrinkling was able to be produced. The deviation of the end sides of the wound-up roll was at an ignorable level.

Example 16

An incised prepreg was produced in the same conditions as in Example 15, except that, as in FIG. 11, a prepreg was passed through between a rotary blade roll and a supporting roll to form an incised prepreg while being pressed against the supporting roll, and the incised prepreg was pressed so that the rotary blade roll-side surface of the incised prepreg separated from the rotary blade roll. As a result, the fluff on the incised prepreg surface was less than in Example 15. The deviation of the end sides of the wound-up roll was at an ignorable level.

Example 17

An incised prepreg was produced in the same conditions as in Example 16, except that the prepreg was a "TORAYCA" (trademark registration) prepreg sheet P3052S-15 (reinforcing fiber: T700S, and thermosetting resin: 2500) on whose supporting roll side a mold release paper that was a sheet substrate A was supported and on whose rotary blade roll side a polyethylene film that was a sheet substrate B was pasted.

As a result, although the incised prepreg gradually deviated in the axis direction of the rotary blade roll and the position control of the end sides of the prepreg was not easy, an incised prepreg was able to be produced stably without wrinkling. The mold release paper peeled off from the incised prepreg at a few sites, but were repairable. The incised prepreg was able to be wound up without wrinkling.

Example 18

An incised prepreg was produced in the same conditions as in Example 17, except that after a prepreg was passed through between a rotary blade roll and a supporting roll, the prepreg and a sheet substrate A were subjected to thermal pressure bonding by using a calendar. The heating temperature was 40° C., and the pressure was 3 kg/cm$^2$.

As a result, there was no site where the mold release paper peeled off from the incised prepreg, and the incised prepreg was able to be wound up without wrinkling.

Example 19

An incised prepreg was produced in the same conditions as in Example 17, except that the pattern of the blades of a rotary blade roll was a pattern as in FIG. 15(*f*) in which the absolute values of the angles θ formed between the blades and the circumferential direction of the rotary blade roll was substantially the same and blades whose θ was positive and blades whose θ was negative were substantially equal in number. The length of reinforcing fibers was 24 mm, θ was ±14°, and Ws was 0.25 mm.

As a result, the incised prepreg was able to be produced stably without wrinkling. The mold release paper did not peel off from the incised prepreg, and the incised prepreg was able to be wound up without wrinkling. There was no deviation of the prepreg in the width direction. At the time of winding up, there was no need for fine adjustment in the width direction.

Example 20

An incised prepreg was produced in the same conditions as in Example 17, except that the prepreg was a "TORAYCA" (trademark registration) prepreg sheet P2352W-19 (reinforcing fiber: T800S, and thermosetting resin: 3900-2B) and the rotary blade roll was cooled. A mold release paper was pasted as a sheet substrate A to the supporting roll side of the prepreg, but a sheet substrate B was not pasted to the rotary blade roll side of the prepreg.

As a result, the incised prepreg was produced without the resin adhering to the blades nor the mold release paper peeling off from the incised prepreg and without wrinkling. The deviation of the end sides of the wound-up roll was at an ignorable level.

Example 21

An incised prepreg was produced in the same conditions as in Example 11, except that as for the incision pattern, θ (the angle formed between the blades and the circumferential direction of the rotary blade roll) was 90°. In the case where the blades were projected in the circumferential direction of the rotary blade roll, the circular shape formed by projecting all the blades on the rotary blade roll to a plane perpendicular to the axis direction of the rotary blade roll had discontinuous portions, and there were a plurality of sites where the central angle formed between the two ends of a discontinuous portion and the center of the circular shape was 6°. Consequently, there were instants when the rotary blade roll did not press the prepreg, so that the supporting roll and the rotary blade roll vibrated. Other than that, substantially the same results as in Example 17 were obtained.

Comparative Example 10

From a roll of 500 mm wide in which a "TORAYCA" (trademark registration) prepreg sheet P3052S-15 (reinforcing fiber: T700S, and thermosetting resin: 2500) had been wound, the prepreg was unwound, and was inserted between the rotary blade roll and the supporting roll and provided with incisions without giving tension to the prepreg, in order to produce an incised prepreg. The obtained incised prepreg was wound up by a roll. The blades of the rotary blade roll were provided in a pattern illustrated in FIG. 16(b). The blades were linear, and the projected length Ws of the blades in the axis direction of the rotary blade roll was 5.0 mm, the angle formed between the blades and the circumferential direction of the rotary blade roll was 40°, and the length of reinforcing fibers divided by the blades was 20 mm. The total of the lengths of the blades was 78 m/m². The supporting roll side of the prepreg was supported by a mold release paper while, on the rotary blade roll side of the prepreg, a polyethylene film was pasted. The rotation speed of the rotary blade roll was 45°/second.

As a result, the prepreg sagged before being inserted between the rotary blade roll and the supporting roll, so that the incised prepreg wrinkled. Furthermore, peeling-off of the mold release paper and deviation of the prepreg in the width direction occurred, so that the incised prepreg could not be stably wound up.

Comparative Example 11

An incised prepreg was produced by unwinding a prepreg from a roll of 300 mm wide in which a "TORAYCA" (trademark registration) prepreg sheet P2255S-10 (reinforcing fiber: T800S, and thermosetting resin: 2592) had been wound, giving tension to the prepreg, and pressing against the prepreg a punching die provided with blades which had been attached to an elevating machine, so that incisions were provided. In the case as in Examples 1 to 8 where an incised prepreg is provided by passing a prepreg through between the rotary blade roll and the supporting roll, provision of incisions and feed of the prepreg can be simultaneously carried out by turning the rotary blade roll. In the case where a punching die is used, a step in which after the prepreg is once stopped from being fed, the punching die is lowered to provide incisions and then the prepreg is fed again is performed. The blades were in a pattern substantially identical to the pattern illustrated in FIG. 17 (e), and the blades were linear, and the projected length Ws of the blades in the width direction of the prepreg was 1.0 mm, and the angle formed between the blades and the feeding direction of the prepreg was 90°, and the length of reinforcing fibers divided by the blades was 24 mm. The total of the lengths of the blades was 42 m/m². The prepreg was supported by a mold release paper. The feed speed of the prepreg was 3 m/minute, and the prepreg was stopped for 1 second to perform punching.

As a result, at the time of punching, the blades moved the prepreg, so that the prepreg itself deviated and the positional relationship between incisions punched out at different timings deteriorated in accuracy.

TABLE 1

| | Mean value for population (counts) | Coefficient of variation for population (%) | Surface quality of press molded article | Tensile elastic modulus (GPa) | Tensile strength (MPa) |
| --- | --- | --- | --- | --- | --- |
| Example 1 | 10.4 | 10.7 | B | 46 | 410 |
| Example 2 | 11.3 | 8.9 | B | 46 | 480 |
| Example 3 | 12.6 | 9.8 | B | 48 | 600 |
| Example 4 | 12.4 | 10.9 | B | 48 | 620 |
| Example 5 | 10.9 | 10.4 | B | 46 | 480 |
| Example 6 | 13.6 | 6.4 | A | 48 | 630 |
| Example 7 | 11.3 | 7.9 | A | 48 | 650 |
| Comparative Example 1 | 7.2 | 17 | D | 46 | 330 |
| Comparative Example 2 | 1.6 | 41.5 | C | 45 | 430 |
| Comparative Example 3 | 1.4 | 39.8 | C | 45 | 460 |
| Comparative Example 4 | 1.6 | 30.6 | C | 44 | 510 |
| Comparative Example 5 | 12.0 | 27.4 | C | 48 | 610 |

TABLE 2

| | Load 1 (N) | Load 2 (N) | Area ratio of opened incisions (%) | Shape conformity to 3-dimensional shape | Surface quality of molded articles | Tensile elastic modulus of molded articles (GPa) | Tensile strength of molded articles (MPa) |
|---|---|---|---|---|---|---|---|
| Example 8 | 590 | 720 | 1.8 | A | C | 46 | 440 |
| Example 9 | 1240 | 970 | 1.2 | B | B | 48 | 620 |
| Example 10 | 1140 | 820 | 1.4 | A | B | 46 | 480 |
| Example 11 | 1630 | 1970 | 0.8 | A | A | 48 | 630 |
| Comparative Example 6 | 5710 | Ruptured | — | C | D | — | — |
| Comparative Example 7 | 1840 | Ruptured | — | C | D | 47 | 580 |

EXPLANATION OF NUMERALS

1: Prepreg
2: Incision
3: Region provided with a plurality of incisions (incised region)
4: Small region of 10 mm in diameter
5: Reinforcing fibers between incision A and incision B
6: Distance between most proximate incisions
7: Positive incision
8: Negative incision
9: Straight line on which positive incisions exist
10: Straight line on which negative incisions exist
11: 0° direction of cross-ply laminate
12: 90° direction of cross-ply laminate
13: 45° direction of cross-ply laminate
14: Incised prepreg
15: Prepreg roll
16: Blade
17: Rotary blade roll
17a: Axis direction of rotary blade roll 17
18: Supporting roll
19: Rotation direction of rotary blade roll
20: Rotation direction of supporting roll
21: Rotation direction of prepreg roll
22: Feeding direction of incised prepreg
23: Tension
24: Presser roll disposed on exit side
25: Presser roll disposed on entrance side
26: Circular shape formed when all blades on rotary blade roll are projected onto plane perpendicular to axis direction of rotary blade roll
27: Discontinuous portion at numerals 26 (region where no blade is present at numerals 26)
28: Central angle
29: Preform

The invention claimed is:

1. An incised prepreg comprising, in at least a partial region in a prepreg that contains unidirectionally oriented reinforcing fibers and a resin, a plurality of incisions that divide reinforcing fibers, wherein, in the case where a population is made up of numbers of incisions contained in ten small circular regions of 10 mm in diameter randomly selected in the region, a mean value for the population is 10 or greater and a coefficient of variation for the population is within 20%.

2. The incised prepreg according to claim 1, wherein a given incision and another incision most proximate to the incision do not divide the same reinforcing fiber.

3. The incised prepreg according to claim 1, wherein the incisions have substantially the same length of Y and a distance between incisions most proximate to each other is longer than 0.5 times Y.

4. The incised prepreg according to claim 1, wherein the incisions are provided obliquely to an orientation direction of the reinforcing fibers.

5. The incised prepreg according to claim 1, wherein absolute values of angles θ formed between an orientation direction of the reinforcing fibers and the incisions are substantially the same and incisions whose θ is positive (referred to as positive incisions) and incisions whose θ is negative (referred to as negative incisions) are included.

6. The incised prepreg according to claim 5, comprising the positive incisions and the negative incisions in substantially equal numbers.

7. The incised prepreg according to claim 5, wherein, as an interval between a given incision and another incision that is present on an extended line of the incision and that is most proximate to the incision, intervals between the positive incisions and intervals between the negative incisions are different in length from each other.

8. A cross-ply laminate that is made up of a plurality of prepregs each of which contains unidirectionally oriented reinforcing fibers and a resin and whose volume fraction Vf of the reinforcing fibers is 45 to 65% and that is configured to include incised prepregs whose fiber directions intersect substantially at right angle,
wherein each prepreg is an incised prepreg which includes a plurality of incisions extending across reinforcing fibers and of which substantially all the reinforcing fibers have a fiber length (L) of 10 to 300 mm and a tensile property 1 indicated below is satisfied in a 25° C. environment or a tensile property 2 indicated below is satisfied in a 60° C. environment,
(tensile property 1) in the case where a fiber direction of one of the incised prepregs in the cross-ply laminate is 0°, load 1×0.5<load 2<load 1×1.5 where the load 1 is a load that occurs in the cross-ply laminate in a 0° direction when a tensile strain of 1% is applied to the cross-ply laminate in the 0° direction and the load 2 is a load that occurs in the cross-ply laminate in the 0° direction when a tensile strain of 2% is applied to the cross-ply laminate in the 0° direction, and (tensile property 2) in the case where the fiber direction of one of the incised prepregs in the cross-ply laminate is 0°, load 1×0.5<load 2<load 1×1.5 where the load 1 is a load that occurs in the cross-ply laminate in the 0° direction when a tensile strain of 1% is applied to the cross-ply laminate in the 0° direction and the load 2 is a load that occurs in the cross-ply laminate in the 0° direction when a tensile strain of 2% is applied to the cross-ply laminate in the 0° direction.

9. The cross-ply laminate according to claim 8,
wherein, in the case where the fiber direction of one of the incised prepregs of the cross-ply laminate is 0°, when, in the 25° C. environment, a tensile strain of 2% is applied to the cross-ply laminate in the 0° direction, a total area of opened incisions relative to an area of the cross-ply laminate (the area ratio of the opened incisions) is greater than or equal to 0% and less than or equal to 1%, and
wherein, in the case where the fiber direction of one of the prepregs of the cross-ply laminate is 0°, when, in the 60° C. environment, a tensile strain of 2% is applied to the cross-ply laminate in the 0° direction, the total area of opened incisions relative to the area of the cross-ply laminate (the area ratio of the opened incisions) is greater than or equal to 0% and less than or equal to 1%.

10. The cross-ply laminate according to claim 8, wherein the prepreg is an incised prepreg comprising, in at least a partial region in a prepreg that contains unidirectionally oriented reinforcing fibers and a resin, a plurality of incisions that divide reinforcing fibers, wherein, in the case where a population is made up of numbers of incisions contained in ten small circular regions of 10 mm in diameter randomly selected in the region, a mean value for the population is 10 or greater and a coefficient of variation for the population is within 20%.

11. The cross-ply laminate according to claim 8, wherein the area is 0.5 m² or greater.

12. A production method for a fiber reinforced plastic in which the cross-ply laminate according to claim 8 is pressed against a mold to provide a preform and, subsequently, the preform is solidified.

* * * * *